(12) United States Patent
Roberts et al.

(10) Patent No.: US 8,346,971 B2
(45) Date of Patent: Jan. 1, 2013

(54) DATA TRANSFER, SYNCHRONISING APPLICATIONS, AND LOW LATENCY NETWORKS

(75) Inventors: Derek Edward Roberts, Cambridge (GB); Steven Leslie Pope, Cambridge (GB); Glenford Ezra Mapp, Cambridge (GB); Stephen John Hodges, Cambridge (GB)

(73) Assignee: AT&T Intellectual Property I, LP, Atlanta, GA (US)

( * ) Notice: Subject to any disclaimer, the term of this patent is extended or adjusted under 35 U.S.C. 154(b) by 1160 days.

(21) Appl. No.: 11/198,260

(22) Filed: Aug. 5, 2005

(65) Prior Publication Data

US 2005/0289238 A1 Dec. 29, 2005

Related U.S. Application Data

(62) Division of application No. 09/980,539, filed as application No. PCT/GB00/01691 on May 3, 2000, now abandoned.

(30) Foreign Application Priority Data

May 4, 1999 (GB) .................................. 9910280.8

(51) Int. Cl.
*G06F 15/16* (2006.01)
(52) U.S. Cl. .................. 709/248; 709/232; 709/212
(58) Field of Classification Search .................. None
See application file for complete search history.

(56) References Cited

U.S. PATENT DOCUMENTS

| | | | |
|---|---|---|---|
| 3,701,972 A | 10/1972 | Berkeley et al. | |
| 4,429,387 A | 1/1984 | Kaminski | |
| 4,644,529 A | 2/1987 | Amstutz et al. | |
| 4,866,664 A | 9/1989 | Burkhardt et al. | |

(Continued)

FOREIGN PATENT DOCUMENTS

CN 101072227 A * 11/2007

(Continued)

OTHER PUBLICATIONS

Gokhale, Aniruddha et al. "Measuring the performance of communication middleware on high-speed networks." SIGCOMM '96 Conference proceedings on Applications, technologies, architectures, and protocols for computer communications. ACM Press. Aug. 1996. 12pp.*

(Continued)

*Primary Examiner* — Jeffrey R Swearingen
(74) *Attorney, Agent, or Firm* — Hanley, Flight & Zimmerman, LLC

(57) ABSTRACT

Asynchronous network interface and method of synchronization between two applications on different computers is provided. The network interface contains snooping hardware which can be programmed to contain triggering values comprising either addresses, address ranges or other data which are to be matched. These data are termed "trip wires". Once programmed, the interface monitors the data stream, including address data, passing through the interface for addresses and data which match the trip wires which have been set. On a match, the snooping hardware can generate interrupts, increment event counters, or perform some other application-specified action. This snooping hardware is preferably based upon Content-Addressable Memory.

The invention thus provides in-band synchronization by using synchronization primitives which are programmable by user level applications, while still delivering high bandwidth and low latency. The programming of the synchronization primitives can be made by the sending and receiving applications independently of each other and no synchronization information is required to traverse the network.

16 Claims, 27 Drawing Sheets

U.S. PATENT DOCUMENTS

| | | | |
|---|---|---|---|
| 4,977,582 A | 12/1990 | Nichols et al. | |
| 4,993,022 A | 2/1991 | Kondo et al. | |
| 5,165,031 A | 11/1992 | Pruul et al. | |
| 5,179,556 A | 1/1993 | Turner | |
| 5,296,936 A | 3/1994 | Pittas et al. | |
| 5,363,484 A | 11/1994 | Desnoyers et al. | |
| 5,388,237 A | 2/1995 | Sodos | |
| 5,438,640 A | 8/1995 | Sasaoka et al. | |
| 5,442,390 A | 8/1995 | Hooper et al. | |
| 5,487,152 A | 1/1996 | Young | |
| 5,488,724 A | 1/1996 | Firoosmand | |
| 5,513,177 A | 4/1996 | Sakurai et al. | |
| 5,513,320 A | 4/1996 | Young et al. | |
| 5,555,390 A | 9/1996 | Judd et al. | |
| 5,566,302 A * | 10/1996 | Khalidi et al. | 709/201 |
| 5,577,251 A * | 11/1996 | Hamilton et al. | 709/203 |
| 5,584,033 A | 12/1996 | Barrett et al. | |
| 5,586,273 A | 12/1996 | Blair et al. | |
| 5,727,154 A | 3/1998 | Christopher | |
| 5,737,607 A * | 4/1998 | Hamilton et al. | 719/316 |
| 5,740,372 A | 4/1998 | Hijino | |
| 5,764,895 A | 6/1998 | Chung | |
| 5,765,011 A | 6/1998 | Wilkinson et al. | |
| 5,778,175 A | 7/1998 | Paul et al. | |
| 5,787,251 A * | 7/1998 | Hamilton et al. | 709/203 |
| 5,790,804 A | 8/1998 | Osborne | |
| 5,797,043 A | 8/1998 | Lewis et al. | |
| 5,862,346 A | 1/1999 | Kley et al. | |
| 5,905,870 A | 5/1999 | Mangin et al. | |
| 5,995,488 A * | 11/1999 | Kalkunte et al. | 370/232 |
| 6,029,205 A | 2/2000 | Alferness et al. | |
| 6,038,643 A | 3/2000 | Tremblay et al. | |
| 6,047,323 A * | 4/2000 | Krause | 709/227 |
| 6,094,715 A | 7/2000 | Wilkinson et al. | |
| 6,101,533 A | 8/2000 | Brandt et al. | |
| 6,134,607 A * | 10/2000 | Frink | 710/52 |
| 6,157,961 A * | 12/2000 | Kessler et al. | 719/315 |
| 6,161,160 A | 12/2000 | Niu et al. | |
| 6,201,817 B1 | 3/2001 | Sullivan | |
| 6,208,655 B1 | 3/2001 | Hodgins et al. | |
| 6,260,073 B1 | 7/2001 | Walker et al. | |
| 6,262,976 B1 | 7/2001 | McNamara | |
| 6,269,413 B1 | 7/2001 | Sherlock | |
| 6,272,557 B1* | 8/2001 | Lim et al. | 719/315 |
| 6,279,050 B1 | 8/2001 | Chilton et al. | |
| 6,314,478 B1 | 11/2001 | Etcheverry | |
| 6,321,252 B1 | 11/2001 | Bhola et al. | |
| 6,356,962 B1 | 3/2002 | Kasper | |
| 6,408,341 B1 | 6/2002 | Feeney et al. | |
| 6,424,477 B1 | 7/2002 | Saito et al. | |
| 6,425,017 B1* | 7/2002 | Dievendorff et al. | 719/315 |
| 6,434,161 B1 | 8/2002 | Higbee et al. | |
| 6,470,398 B1 | 10/2002 | Zargham et al. | |
| 6,549,934 B1* | 4/2003 | Peterson et al. | 709/223 |
| 6,567,953 B1 | 5/2003 | Pomerantz | |
| 6,637,020 B1* | 10/2003 | Hammond | 719/332 |
| 6,715,002 B2 | 3/2004 | Kasper | |
| 6,717,910 B1 | 4/2004 | Kasper et al. | |
| 6,757,398 B2 | 6/2004 | Foley | |
| 6,757,744 B1 | 6/2004 | Narisi et al. | |
| 6,792,085 B1 | 9/2004 | Rigaldies et al. | |
| 6,907,473 B2 | 6/2005 | Schmidt et al. | |
| 6,920,507 B1 | 7/2005 | Kley et al. | |
| 6,954,923 B1 | 10/2005 | Yates et al. | |
| 6,963,946 B1 | 11/2005 | Dwork et al. | |
| 7,007,099 B1 | 2/2006 | Donati et al. | |
| 7,046,625 B1 | 5/2006 | Kasper | |
| 7,072,294 B2 | 7/2006 | Kasper et al. | |
| 7,190,284 B1 | 3/2007 | Dye et al. | |
| 7,337,248 B1 | 2/2008 | Rao et al. | |
| 7,689,738 B1 | 3/2010 | Williams et al. | |
| 7,769,923 B2 | 8/2010 | Pope et al. | |
| 7,802,031 B2 | 9/2010 | Kwak et al. | |
| 7,953,857 B2 | 5/2011 | Short et al. | |
| 2001/0003193 A1 | 6/2001 | Woodring et al. | |
| 2002/0052984 A1* | 5/2002 | Jindal et al. | 709/330 |
| 2005/0188129 A1 | 8/2005 | Abdelilah et al. | |
| 2005/0267996 A1 | 12/2005 | O'Connor et al. | |
| 2005/0289238 A1 | 12/2005 | Mapp et al. | |
| 2006/0069845 A1 | 3/2006 | Ishida et al. | |
| 2006/0171658 A1 | 8/2006 | Jochemsen et al. | |
| 2006/0265520 A1 | 11/2006 | Kwak et al. | |
| 2007/0271572 A1 | 11/2007 | Gupta et al. | |
| 2007/0277021 A1 | 11/2007 | O'Connor et al. | |

FOREIGN PATENT DOCUMENTS

| | | |
|---|---|---|
| EP | 0 251 584 A | 1/1988 |
| EP | 0 359 137 A | 3/1990 |
| EP | 0 772 368 A | 5/1997 |
| EP | 0 784 268 A | 7/1997 |
| EP | 1 302 853 | 4/2003 |
| GB | 2 315 638 A | 2/1998 |
| GB | 2004/025477 | 3/2004 |
| JP | 60 211559 A | 10/1985 |
| JP | 06311126 | 11/1994 |
| JP | 10133997 | 5/1998 |
| WO | WO 01/29653 A1 * | 4/2001 |

OTHER PUBLICATIONS

NN9310131. "Chaining of Remote Procedure Calls in Distributed Computer Environment / Remote Procedure Call." IBM Technical Disclosure Bulletin. Oct. 1, 1993. US. vol. 36, Issue 10, 6 pages.*

Shaw, R. H.; "A Complete Guide to OS/2 Interprocess Communications and Device Monitors"; Microsoft Systems Journal, U.S. Microsoft Co., Redmond, WA, vol. 4, No. 5; pp. 35-60; Sep. 1989; XP000568106.

Mogul, J.C., et al.; "The Packet Filter: An Efficient Mechanism for User-Level Network Code"; Operating Systems Review (SIGOPS), U.S., ACM Headquarter, New York; 1987; pp. 39-51; XP002913603.

Anonymous; "Low-level Interprocess Communication Facility Interface"; IBC Technical Disclosure Bulletin, vol. 30, No. 10; pp. 146-148; Mar. 1988; XP002151749.

Hess et al.; "Implementation and Evaluation of a Prototype Reconfigurable Router," Field Programmable Custom Computing Machines; Apr. 21, 1999; pp. 44-50.

Bian, Qiyong et al.; "Dynamic Flow Switching: A New Communication Service for ATM Networks." INFOCOM '98: 17th Annual Joint Conference of the IEEE Computer and Communications Societies Proceedings; IEEE; 1998; pp. 955-963.

Degermark, Mikael et al.; "Low-Loss TCP/IP header compression for wireless networks." Wireless Networks; vol. 3, Oct. 1997; Kluwer Academic Publishers; pp. 375-387.

European Office Action for corresponding application No. 00 925 509.2 dated Nov. 11, 2009.

United States Patent and Trademark Office, Office Action for corresponding U.S. Appl. No. 11/198,043 dated Dec. 14, 2010.

United States Patent and Trademark Office, Office Action for corresponding U.S. Appl. No. 11/198,043 dated Sep. 30, 2010.

United States Patent and Trademark Office, Office Action for corresponding U.S. Appl. No. 11/198,043 dated Jun. 21, 2010.

United States Patent and Trademark Office, Office Action for corresponding U.S. Appl. No. 11/198,043 dated Jul. 22, 2009.

United States Patent and Trademark Office, Office Action for corresponding U.S. Appl. No. 11/198,043 dated Oct. 30, 2008.

United States Patent and Trademark Office, Office Action for corresponding U.S. Appl. No. 11/198,043 dated Jul. 2, 2008.

United States Patent and Trademark Office, Office Action for corresponding U.S. Appl. No. 11/198,043 dated Feb. 13, 2008.

United States Patent and Trademark Office, Office Action for corresponding U.S. Appl. No. 09/980,539 dated May 18, 2006.

United States Patent and Trademark Office, Office Action for corresponding U.S. Appl. No. 09/980,539 dated Oct. 26, 2005.

United States Patent and Trademark Office, Office Action for corresponding U.S. Appl. No. 12/105,412 dated Mar. 16, 2011.

United States Patent and Trademark Office, Office Action for corresponding U.S. Appl. No. 12/105,412 dated Sep. 30, 2010.

United States Patent and Trademark Office, Office Action for corresponding U.S. Appl. No. 12/105,412 dated Aug. 4, 2010.

United States Patent and Trademark Office, Office Action for corresponding U.S. Appl. No. 12/105,412 dated Apr. 14, 2010.

United States Patent and Trademark Office, Office Action for corresponding U.S. Appl. No. 12/105,412 dated Aug. 21, 2009.
United States Patent and Trademark Office, Notice of Allowance for corresponding U.S. Appl. No. 11/198,252 dated Mar. 21, 2011.
United States Patent and Trademark Office, Office Action for corresponding U.S. Appl. No. 11/198,252 dated Oct. 5, 2010.
United States Patent and Trademark Office, Office Action for corresponding U.S. Appl. No. 11/198,252 dated Jul. 27, 2010.
United States Patent and Trademark Office, Office Action for corresponding U.S. Appl. No. 11/198,252 dated May 26, 2010.
United States Patent and Trademark Office, Office Action for corresponding U.S. Appl. No. 11/198,252 dated Oct. 29, 2009.
Patent Cooperation Treaty, International Preliminary Examination Report for corresponding International Application No. PCT/GB00/01691 dated Aug. 31, 2001.
European Patent Office, Communication pursuant to Article 64(3) EPC issued for corresponding Application No. 00 925 509.2-2212 dated Nov. 11, 2009.
European Patent Office, Communication pursuant to Article 64(3) EPC issued for corresponding Application No. 00 925 509.2-2212 dated Apr. 13, 2004.
European Patent Office, Communication pursuant to Article 64(3) EPC issued for corresponding Application No. 00 925 509.2-2212 dated Apr. 19, 2002.
Patent Cooperation Treaty, Written Opinion issued for corresponding Application No. PCT/GB00/01691 dated Jul. 3, 2001.
United States Patent and Trademark Office, Non-final Office Action, issued for U.S. Appl. No. 12/105,412, mailed on Apr. 12, 2012, 6 pages.
The United States Patent and Trademark Office, Non-Final Rejection, for U.S. Appl. No. 12/105,412, issued on Jan. 3, 2012, (7 pages).
International Report regarding Application No. PCT/GB/01691 dated Apr. 9, 2001.
Shaw, R. H.; "A Complete Guide to OS/2 Interprocess Communications and Device Monitors"; Microsoft Systems Journal, U.S. Microsoft Co., Redmond, WA, vol. 4, No. 5; pp. 35-60; Sep. 1, 1989; XP000568106.
Mogul, J.C., et al.; "The Packet Filter: An Efficient Mechanism for User-Level Network Code"; Operating Systems Review (SIGOPS), U.S., ACM Headquarter, New York; 1987, pp. 35-51; XP002913603.
Anonymous; "Low-level Interprocess Communication Facility Interface"; IBC Technical Disclosure Bulletin, vol. 30, No. 10; pp. 146-148; Mar. 1, 1988; XP002151749.
The United States Patent and Trademark Office, Notice of Allowance issued in connection with U.S. Appl. No. 11/198,252 on Jul. 11, 2011.
The United States Patent and Trademark Office, Office action issued in connection with U.S. Appl. No. 12/105,412 on Aug. 1, 2011.
United States Patent and Trademark Office, "Final Office Action", issued for patent application U.S. Appl. No. 12/105,412, mailed on Aug. 7, 2012, 6 pages.
United States Patent and Trademark Office, "Notice of Allowance and Fee(s) Due", issued for patent application U.S. Appl. No. 12/105,412, mailed on Aug. 30, 2012, 12 pages.

* cited by examiner

Synchronous computer networks

Memory mapped networking

Showing synchronisation in a memory mapped network

Hardware communication over a memory mapped network.

Showing NICs of present invention being used to construct a computer network

Showing the functional blocks of the NIC in one embodiment of the invention

Functional blocks of the NIC deployed within a field programmable gate array

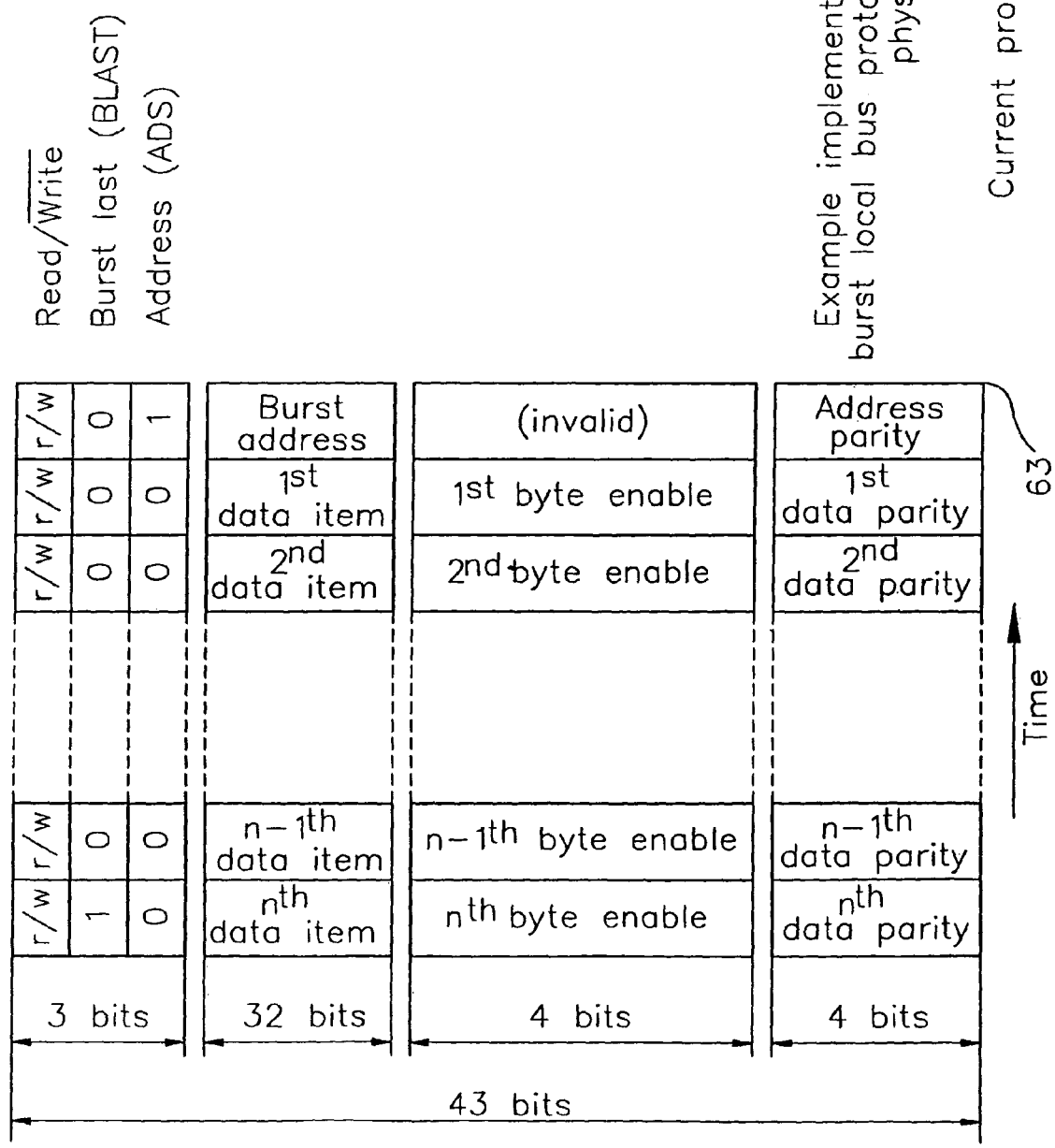

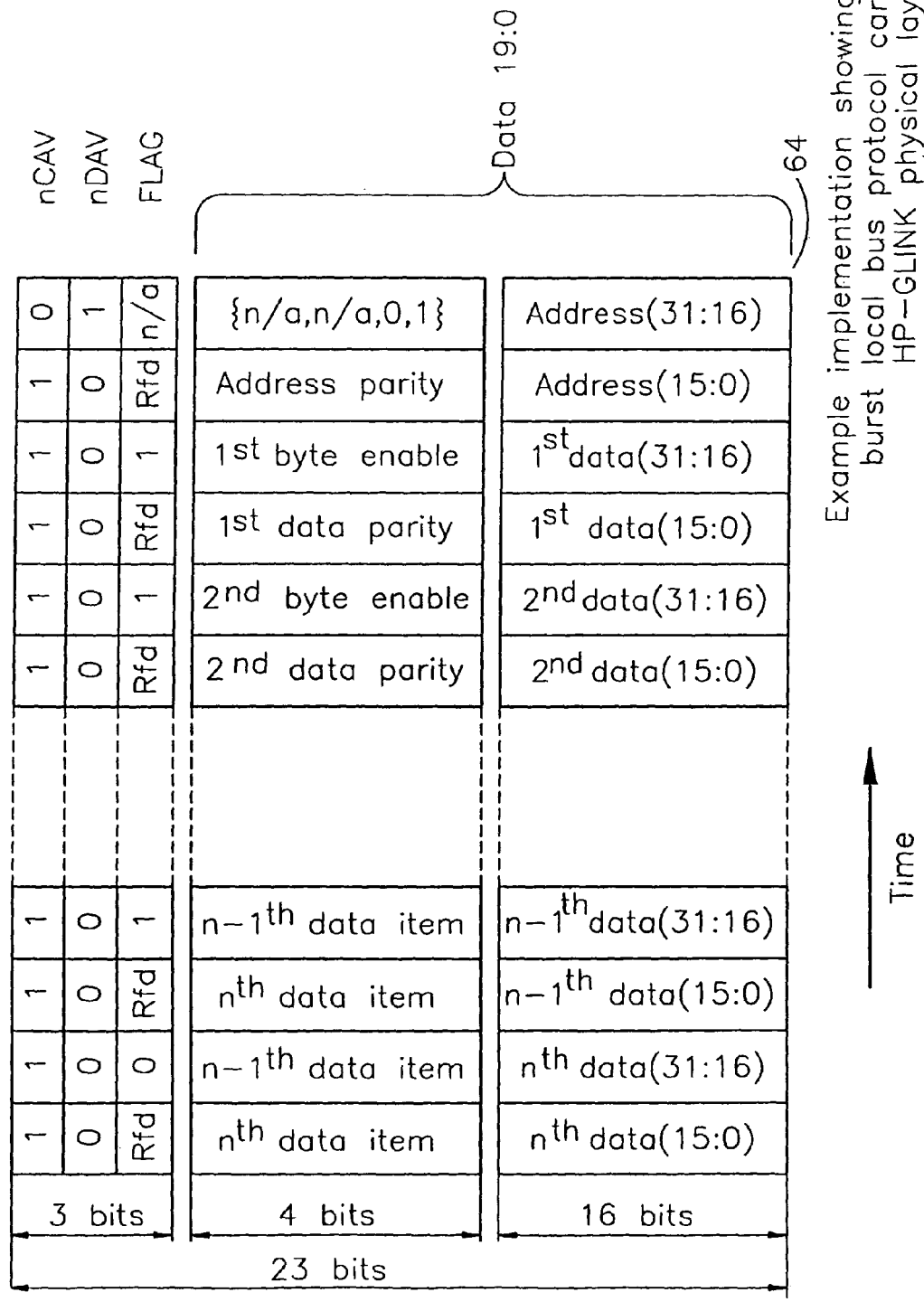

Current protocol embodiment (Read burst)
Example implementation showing i960-style burst local bus protocol carried on HP-GLINK physical layer Example implementation showing i960-style burst local bus protocol carried on HP-GLINK physical layer
Current protocol embodiment (Read data burst returning)

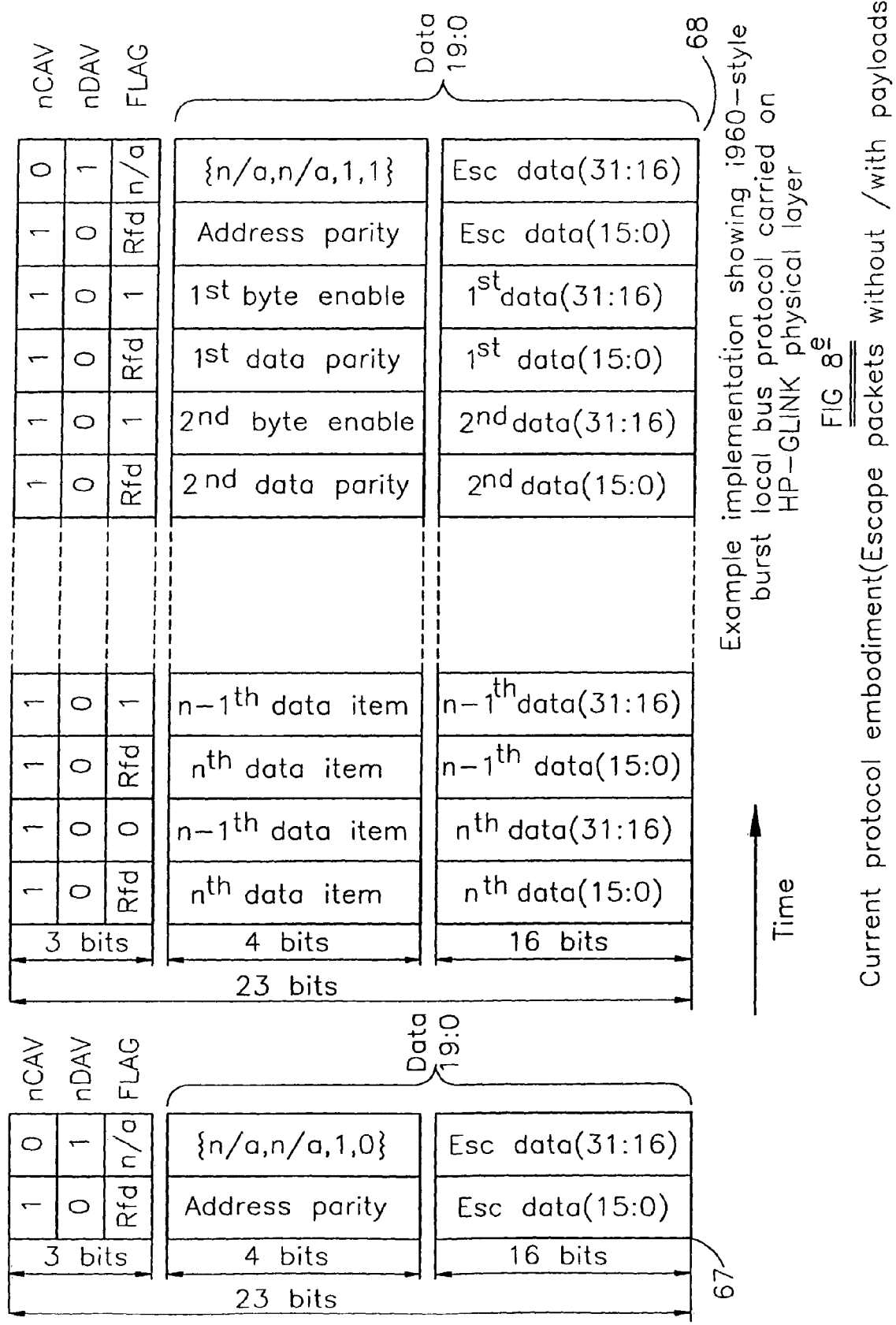

Hardware communication using the NIC of FIG. 6.

Support for discrete message communication using circular buffers

Client-server interaction using two NICs

VIA support

Outgoing stream synchronisation

FIG 15 Client-server interaction using a NIC and a hardware data source

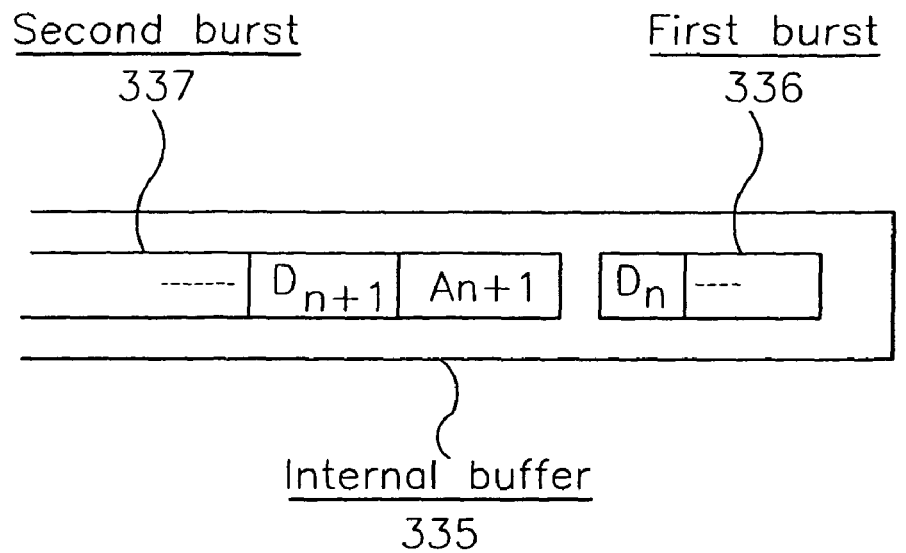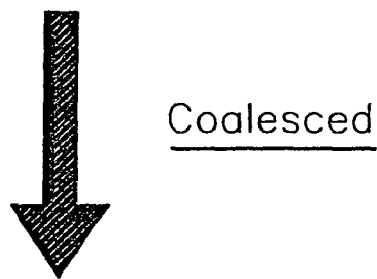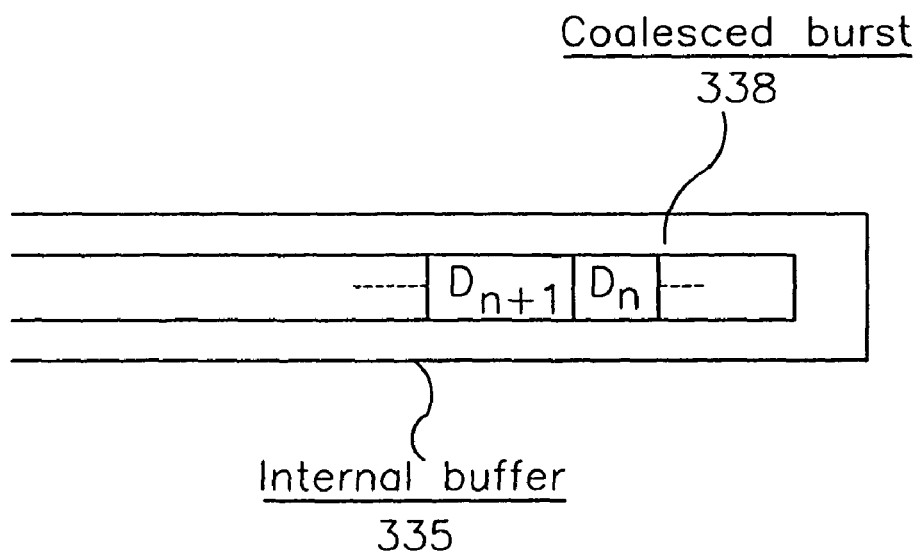
FIG 27

DATA TRANSFER, SYNCHRONISING APPLICATIONS, AND LOW LATENCY NETWORKS

This application is a divisional of U.S. patent application Ser. No. 09/980,539 filed on Oct. 23, 2001, now abandoned, which is a §371 of International Application No. PCT/GB00/01691 filed May 3, 2000, which is hereby incorporated herein by reference in its entirety, and which claims the benefit of United Kingdom patent application no. 9910280.8, filed on May 4, 1999.

This invention, in its various aspects, relates to the field of asynchronous networking, and specifically to: a memory mapped network interface; a method of synchronising between a sending application, running on a first computer, and a receiving application, running on a second computer, the computers each having a memory mapped network interface; a communication protocol; and a computer network. This invention also relates to data transfer and to synchronising applications.

Due to a number of reasons, traditional networks, such as Gigabit Ethernet, ATM, etc., have not been able to deliver high bandwidth and low latency to applications that require them. A traditional network is shown in FIG. 1. To move data from computer 200 to another computer 201 over a network, the Central Processing Unit (CPU) 202 writes data from memory 204 through its system controller 206 to its Network Interface Card (NIC) 210. Alternatively, data may be transferred to the NIC 210 using Direct Memory Access (DMA) hardware 212 or 214. The NIC 210 takes the data and forms network packets 216, which contain enough information to allow them to be routed across the network 218 to computer system 201.

When a network packet arrives at the NIC 211, it must be demultiplexed to determine where the data needs to be placed. In traditional networks this must be done by the operating system. The incoming packet therefore generates an interrupt 207, which causes software, a device driver in operating system 209, to run. The device driver examines the header information of each incoming network packet 216 and determines the correct location in memory 205, for data contained within the network packet. The data is transferred into memory using the CPU 203 or DMA hardware (not shown). The driver may then request that operating system 209 reschedule any application process that is blocked waiting for this data to arrive. Thus there is a direct sequence from the arrival of incoming packets to the scheduling of the receiving application. These networks therefore provide implicit synchronisation between sending and receiving applications and are called synchronous networks.

It is difficult to achieve optimum performance using modern synchronous network hardware. One reason is that the number of interrupts that have to be processed increases as packets are transmitted at a higher rate. Each interrupt requires that the operating system is invoked and software is executed for each packet. Such overheads both increase latency and the data transfer size threshold at which the maximum network bandwidth is achieved.

These observations have led to the development of asynchronous networks. In asynchronous networks, the final memory location within the receiving computer for received data can be computed by the receiving NIC from the header information of a received network packet. This computation can be done without the aid of the operating system.

Hence, in asynchronous networks there is no need to generate a system interrupt on the arrival of incoming data packets. Asynchronous networks therefore have the potential of delivering high bandwidth and low latency; much greater than synchronous networks.

The Virtual Interface Architecture (VIA) is emerging as a standard for asynchronous networking.

Memory-mapped networks are one example of asynchronous networks. An early computer network using memory mapping is described in U.S. Pat. No. 4,393,443.

A memory-mapped network is shown in FIG. 2. Application 222 running on Computer 220 would like to communicate with application 223 running on Computer 221 using network 224. A portion of the application 222's memory address space is mapped using the computer 220's virtual memory system onto a memory aperture of the NIC 226 as shown by the application's page-tables 228 (these page-tables and their use is well known in the art). Likewise, a portion of application 223's memory address space is mapped using computer 221's virtual memory system onto a memory aperture of the NIC 229 using the application 223's page-tables 231. Software is usually required to create these mappings, but once they have been made, data transfer to and from a remote machine can be achieved using a CPU read or write instruction to a mapped virtual memory address.

If application 222 were to issue a number of processor write instructions to this part of its address space, the virtual memory and I/O controllers of computer 220 will ensure that these write instructions are captured by the memory aperture of the NIC 226. NIC 226, determines the address of the destination computer 221 and the address of the remote memory aperture 225 within that computer. Some combination of this address information can be regarded as the network address, which is the target of the write.

All the aperture mappings and network address translations are calculated at the time that the connection between the address spaces of computers 220 and 221 is made. The process of address lookups and translations at each stage in the system can be carried out using hardware.

After receiving a write, NIC 226 creates network packets using its packetisation engine 230. These packets are forwarded to the destination computer 221. At the destination, the memory aperture addresses of the incoming packets are remapped by the packet handler onto physical memory locations 227. The destination NIC 229 then writes the incoming data to these physical memory locations 227. This physical memory has also been mapped at connection set-up time into the address space of application 223. Hence application 223 is able, using page-tables 231 and the virtual memory system, to access the data using processor read and write operations.

Commercial equipment for building memory-mapped networks is available from a number of vendors, including Dolphin Interconnect Solutions. Industry standards, such as Scalable Coherent Interface (SCI) (IEEE Standard 1596-1992), have been defined for building memory mapped networks, and implementations to the standards are currently available.

SCI is an example of an asynchronous network standard, which provides poor facilities for synchronisation at the time of data reception. A network using SCI is disclosed in U.S. Pat. No. 5,819,075. FIG. 3 shows an example of an SCI-like network, where application 242 on computer 240 would like to communicate with application 243 on computer 241. Let us suppose that application 243 has blocked waiting for the data.

Application 242 transmits data using the methods described above. After sending the data, application 242 must then construct a synchronisation packet in local memory, and program the event generator 244, in NIC 246, to send the synchronisation packet 248, to the destination node.

On receiving synchronisation packet 248, the NIC 245 on computer 241, invokes its event handler 247, which generates an interrupt 249 allowing the operating system 248 to determine that application 243 is blocked and should be woken up. This is called out-of-band synchronisation since the synchronisation packet must be treated as a separate and distinct entity and not as part of the data stream. Out-of-band synchronisation greatly reduces the potential of memory-mapped networks to provide high bandwidth and low latency.

In other existing asynchronous networks, such as the newly emerging Virtual Interface Architecture (VIA) standard and the forthcoming Next Generation Input/Output (NGIO) standard, some support is provided for synchronisation. A NIC will raise a hardware interrupt when some data has arrived. However, the interrupt does not identify the recipient of the data, instead only indicates that some data has arrived for some communicating end-point.

While delivery of data can be achieved solely by hardware, the software task of scheduling between a large number of applications, each handling received data, becomes difficult to achieve. Software, known as a device driver, is required to examine a large number of memory locations to determine which applications have received data. It must then notify such applications that data has been delivered to them. This might include a reschedule request to the operating system for the relevant applications.

Other known data transfer techniques are disclosed in EP 0 600 683, EP 0 359 137, EP 0 029 800, U.S. Pat. No. 5,768, 259, U.S. Pat. No. 5,550,808 and JP 600211559.

The present invention, in its various aspects, is defined in more detail in the appended claims to which reference should now be made.

A first aspect of the invention provides a method of synchronising between a sending application on a first computer and a receiving application on a second computer, each computer having a main memory, and at least one of the computers having an asynchronous network interface, comprising the steps of:
  providing the asynchronous network interface with a set of rules for directing incoming data to memory locations in the main memory of the second computer;
  storing in the network interface one or more triggering value(s), each triggering value representing a state of a data transfer between the applications;
  receiving, at the network interface, a data stream being transferred between the applications;
  comparing at least part of the data stream received with the stored triggering values;
  if the compared part of the data stream matches any stored triggering value, indicating that the triggering value has been matched; and
  storing the data received in the main memory of the second computer at one or more memory location(s) in accordance with the said rules.

Another aspect of the invention provides an asynchronous network interface for use in a host computer having a main memory and connected to a network, the interface comprising:
  means for storing a set of rules for directing incoming data to memory locations in the main memory of the host computer;
  a memory for storing one or more triggering value(s), each value representing a state of a data transfer between two or more applications in the computer network;
  a receiver for receiving a data stream being transferred between two or more applications in the computer network; comparison means for comparing at least part of the data stream received by the network interface with the stored triggering values; and
  a memory for storing information identifying any matched triggering values.

A further aspect of the invention provides a method of passing data between an application on a first computer and remote hardware within a second computer or on a passive backplane, the first computer having a main memory and an asynchronous network interface, the method comprising the steps of:
  providing the asynchronous network interface with a set of rules for directing incoming data to memory or I/O location(s) of the remote hardware;
  storing in the network interface one or more triggering value(s), each triggering value representing a state of a data transfer between the application and the hardware;
  receiving, at the network interface, a data stream being transferred between the application and the hardware;
  comparing at least part of the data stream received with the stored triggering value(s);
  indicating that a triggering value has been matched, if any compared part of the data stream matches a triggering value;
  storing data transmitted in memory or I/O location(s) of the remote hardware in accordance with the said rules; and
  storing the data received in the main memory of the computer at one or more memory location(s) in accordance with the said rules.

A further aspect of the invention provides a method of arranging data transfers from one or more applications on a computer, the computer having a main memory, an asynchronous network interface, and a Direct Memory Access (DMA) engine having a request queue address common to all the applications, comprising the steps of:
  the application requesting the network interface to store a triggering value corresponding to a property of the data block to be transferred;
  an application requesting the DMA engine to transfer a block of data;
  the network interface storing a triggering value corresponding to a property of the data block to be transferred, along with an identification of the application which requested the DMA transfer;
  the network interface monitoring the data stream being sent by the applications and comparing at least part of the data stream with the triggering value(s) stored in its memory; and
  if any triggering value matches, indicating that that triggering value has matched.

A yet further aspect of the invention provides a method of transferring data from a sending application on a first computer to a receiving application on a second computer, each computer having a main memory, and a memory mapped network interface, the method comprising the steps of:
  creating a buffer in the main memory of the second computer for storing data being transferred as well as data identifying one or more pointer memory location(s);
  storing at said pointer memory location(s) at least one write pointer and at least one read pointer for indicating those areas of the buffer available for writes and for reads;
  in dependence on the values of the WRP(s) and RDP(s), the sender application writing to the buffer;
  updating the value of the WDP(s), after a write has taken place, to update the indication of the areas of the buffer available for reads and writes;
  in dependence on the values of WRP(s) and RDP(s), the receiver application reading from the buffer; and updating the value of the RDP(s), after a read has taken place, to update the indication of the areas of the buffer available for reads and writes.

Another aspect of the invention provides a computer network comprising two computers, the first computer running a sending application and the second computer running a receiving application, each computer having a main memory and a memory mapped network interface, the main memory of the second computer having: a buffer for storing data being transferred between computers as well as data identifying one or more pointer memory location(s);

means for reading at least one write pointer (WRP) and at least one read pointer (RDP) stored at (a) pointer memory location(s), for indicating those areas of the buffer available for writes and those areas available for reads;
the network interface of the second computer comprising:
a memory mapping;
means for reading data from the buffer in accordance with the contents of the WRP(s) and RDP(s); and
means for updating the value of the RDP(s), after a read has taken place, to update the indication of the areas of the buffer available for reads and writes.

A further aspect of the invention provides a method of sending a request from a client application on a first computer to a server application on a second computer, and sending a response from the server application to the client application, both computers having a main memory and a memory mapped network interface, the method comprising the steps of:

(A) providing a buffer in the main memory of each computer;
(B) the client application, providing software stubs which produce a marshalled stream of data representing the request;
(C) the client application sending the marshalled stream of data to the server's buffer;
(D) the server application unmarshalling the stream of data by providing software stubs which convert the marshalled stream of data into a representation of the request in the server's main memory;
(E) the server application processing the request and generating a response;
(F) the server application providing software stubs which produce a marshalled stream of data representing the response;
(G) the server application sending the marshalled stream of data to the client's buffer; and
(H) the client application unmarshalling the received stream of data by providing software stubs which convert the received marshalled stream of data into a representation of the response in the client's main memory.

Another aspect of the invention provides a method of arranging data for transfer as a data burst over a computer network comprising the steps of: providing a header comprising the destination address of a certain data word in the data burst, and a signal at the beginning or end of the data burst for indicating the start or end of the burst, the destination addresses of other words in the data burst being inferrable from the address in the header.

A further aspect of the invention provides a method of processing a data burst received over a computer network comprising the steps of:
reading a reference address from the header of the data burst, and
calculating the addresses of each data word in the burst from the position of that data word in the burst in relation to the position of the data word to which the address in the header corresponds, and from the reference address read from the header.

Another aspect of the invention provides a method of interrupting transfer of a data burst over a computer network comprising the steps of:
halting transfer of a portion of the data burst which has not yet been transferred, thereby splitting the data burst into two burst sections, one which is transferred, and one waiting to be transferred.

A further aspect of the invention provides a method of restarting the transfer of a data burst, after the transfer of that data burst has been interrupted, the method comprising the steps of:
calculating a new reference address for the untransferred data burst section from the address contained in the header of the whole data burst, and from the position in the whole data burst of the first data word of the untransferred data burst section in relation to the position of the data word to which the address in the header corresponds;
providing a new header for the untransferred data burst section comprising the new reference address; and
transmitting the new header along with the untransferred data burst section.

The first aspect of the present invention addresses the synchronisation problem for memory mapped network interfaces. The present invention uses a network interface, containing snooping hardware which can be programmed to contain triggering values comprising either addresses, address ranges, or other data which are to be matched. These data are termed 'Tripwires'. Once programmed, the interface monitors the data stream, including address data, passing through the interface for addresses and data which match the Tripwires which have been set. On a match, the snooping hardware can generate interrupts or increment event counters, or perform some other application specified action. This snooping hardware is preferably based upon Content Addressable Memory (CAM). References herein to the "data stream" refer to the stream of data words being transferred and to the address data accompanying them.

The invention thus provides in-band synchronisation by using synchronisation primitives which are programmable by user level applications, while still delivering high bandwidth and low latency. The programming of the synchronisation primitives can be made by the sending and receiving applications independently of each other and no synchronisation information is required to traverse the network.

A number of different interfaces between the network interface and an application can be supported. These interfaces include VIA and the forthcoming Next Generation Input/Output (NGIO) standard. An interface can be chosen to best match an application's requirements, and changed as its requirements change. The network interface of the present invention can support a number of such interfaces simultaneously.

The Tripwire facility supports the monitoring of outgoing as well as incoming data streams. These Tripwires can be used to inform a sending application that its DMA send operations have completed or are about to complete.

Memory-Mapped network interfaces also have the potential to be used for communication between hardware entities. This is because memory mapped network interfaces are able to pass arbitrary memory bus cycles over the network. As shown in FIG. 4, it is possible to set up a memory aperture 254, in the NIC 252 of Computer 250, which is directly mapped via NIC 259, onto an address region 257 of the I/O bus 253 of passive backplane 251.

Using existing memory mapped interfaces, such as DEC Memory Channel or Dolphin SCI, an application running on Computer 250, which requires use of the hardware device 255, would require a (usually software) process to interface between itself and the Network Interface card (NIC) 252. This is because the NIC 252, would not appear at the hardware level in computer 250 as an instance of the remote hardware device 255, but instead as a network card which has a memory aperture 254 mapped onto the hardware device.

In a further aspect of the invention, we have appreciated that the interface of the present invention can be programmed to present the same hardware interface as the remote hardware device 255, and so appear at the hardware level in computer 250 to be an instance of the remote hardware device. If the network card 252 were an interface according to the present invention, so programmed, the remote hardware device 255 would appear as physically located within computer 250, in a manner transparent to all software. The hardware device 255, is able to be physically located both at the remote end of a dedicated link, or over a general network. The invention will support both general networking activity and remote hardware communication simultaneously on a single network card.

Another aspect of the invention relates to a link-level communication protocol which can be used to support cut-through routing and forwarding. There is no need for an entire packet to arrive at a NIC, or any other network entity supporting the communication protocol, before data transmission can be started on an outgoing link.

The invention also allows large bursts of data to be handled effectively without the need for a small physical network packet size such as that employed by an ATM network, it being possible to dynamically stop and restart a burst and regenerate all address information using hardware.

A preferred embodiment of the various aspects of the invention will now be described with reference to the drawings in which:

FIGS. 8a-8e shows show the communication protocol used in one embodiment of the invention;

FIG. 27 illustrates coalescing of two data bursts;

Figure 5:
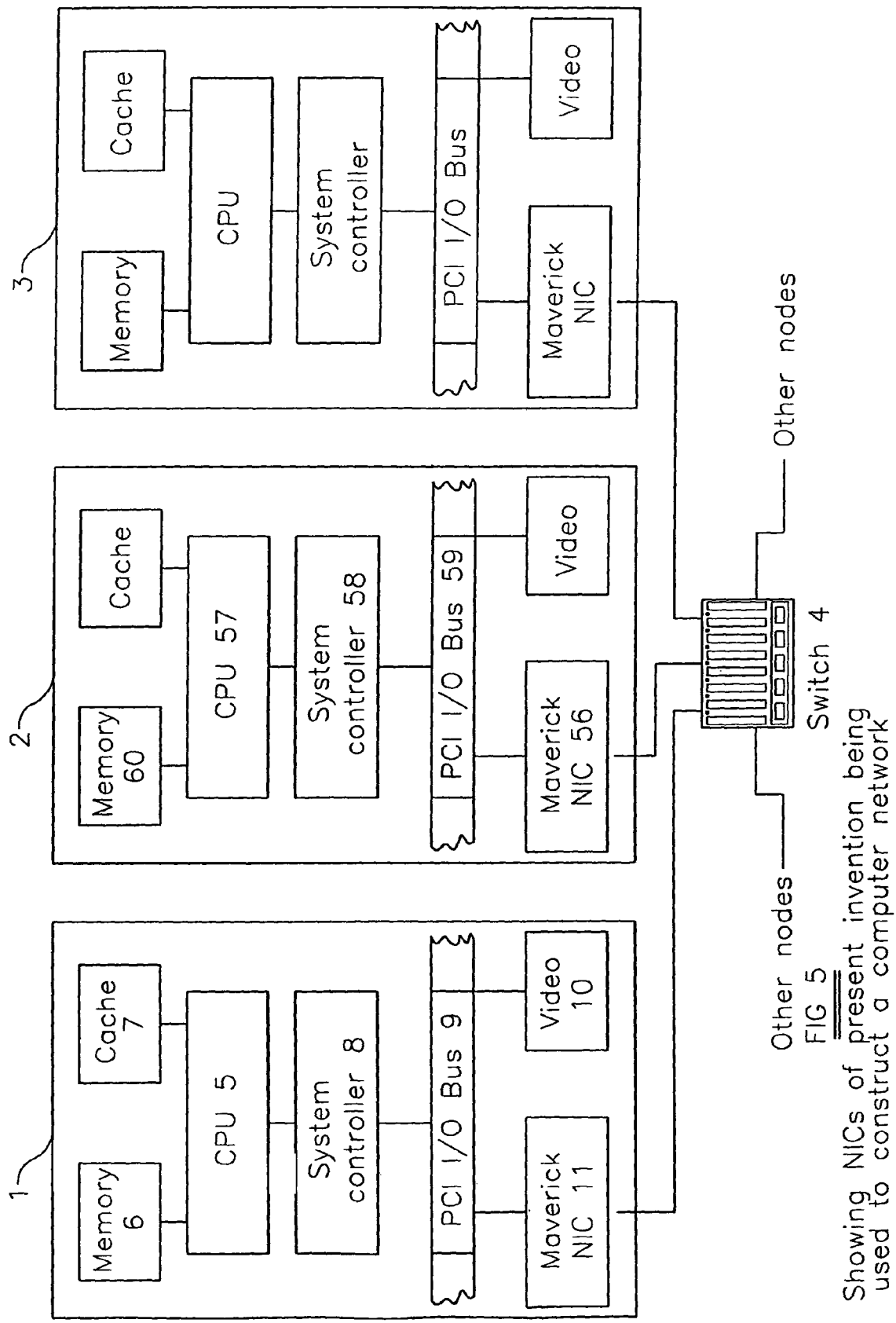
FIG. 5 shows two or more computers connected by an embodiment of the present invention, using Network Interface Cards (NICs)

Referring to FIG. 5, computers 1, 2 use the present invention to exchange data. A plurality of other computers such as 3, may participate in the data exchange if connected via optional network switch 4.

Each computer 1, 2 is composed of a microprocessor central processing unit 5,57, memory 6,60, local cache memory 7,57, and system controller 8,58. The system controller 8,58 interacts with its microprocessor 5,57 to allow the microprocessor to exchange data with devices attached to I/O bus 9. Attached to I/O bus 9,59 are standard peripherals, such as a video adapter 10. Also attached to I/O bus 9,59 is one or more network interfaces, in the form of NICS 11,56 which represent an embodiment of this invention. In computers 1, 2 the I/O bus is a standard PCI bus conforming to PCI Local Bus Specification, Rev. 2.1, although any other bus capable of supporting bus master operations can be used with suitable modification of System Controller peripherals, such as video card 10, and the interface to NIC 11,56.

Figure 6:
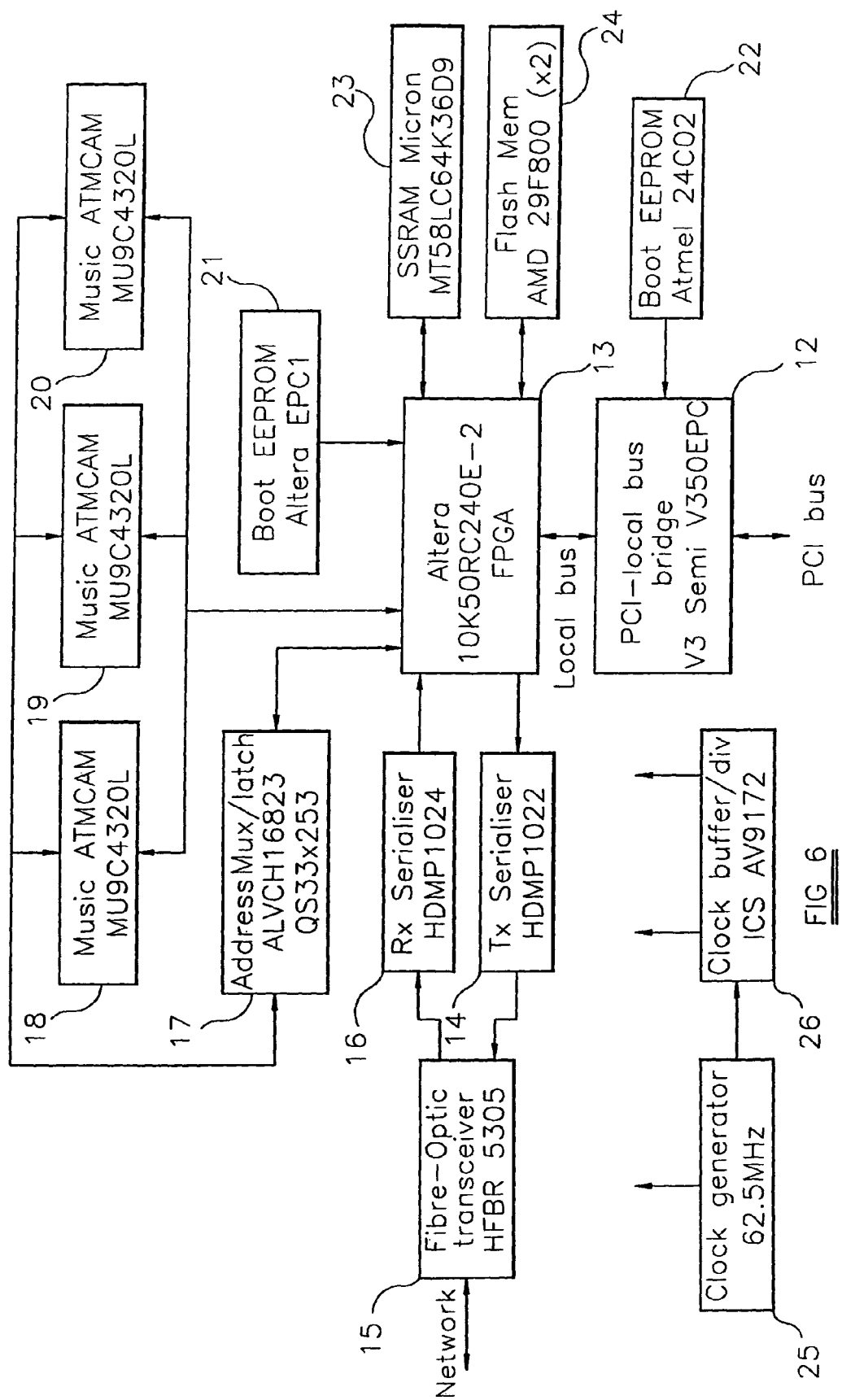
FIG. 6 shows in detail the various functional blocks comprising the NICs of FIG. 5.

Referring to FIG. 6, each NIC comprises a memory 18, 19, 20 for storing triggering values, a receiver 15 for receiving a data stream, a comparator for comparing part of the data stream with the triggering values and a memory 23 for storing information which will identify matched triggering values. More specifically, in the preferred embodiment each NIC 56, 11 is composed of a PCI to Local Bus bridge 12, a control Field Programmable Gate Array (FPGA) 13, transmit (Tx) serialiser 14, fibre-optic transceiver 15, receive (Rx) de-serialiser 16, address multiplexer and latch 17, CAM array 18, 19, 20, boot ROMs 21 and 22, static RAM 23, FLASH ROM 24, and clock generator and buffer 25, 26. FIG. 6 also shows examples of known chips which could be used for each component, for example boot ROM 21 could be an Altera EPC1 chip.

Figure 7:
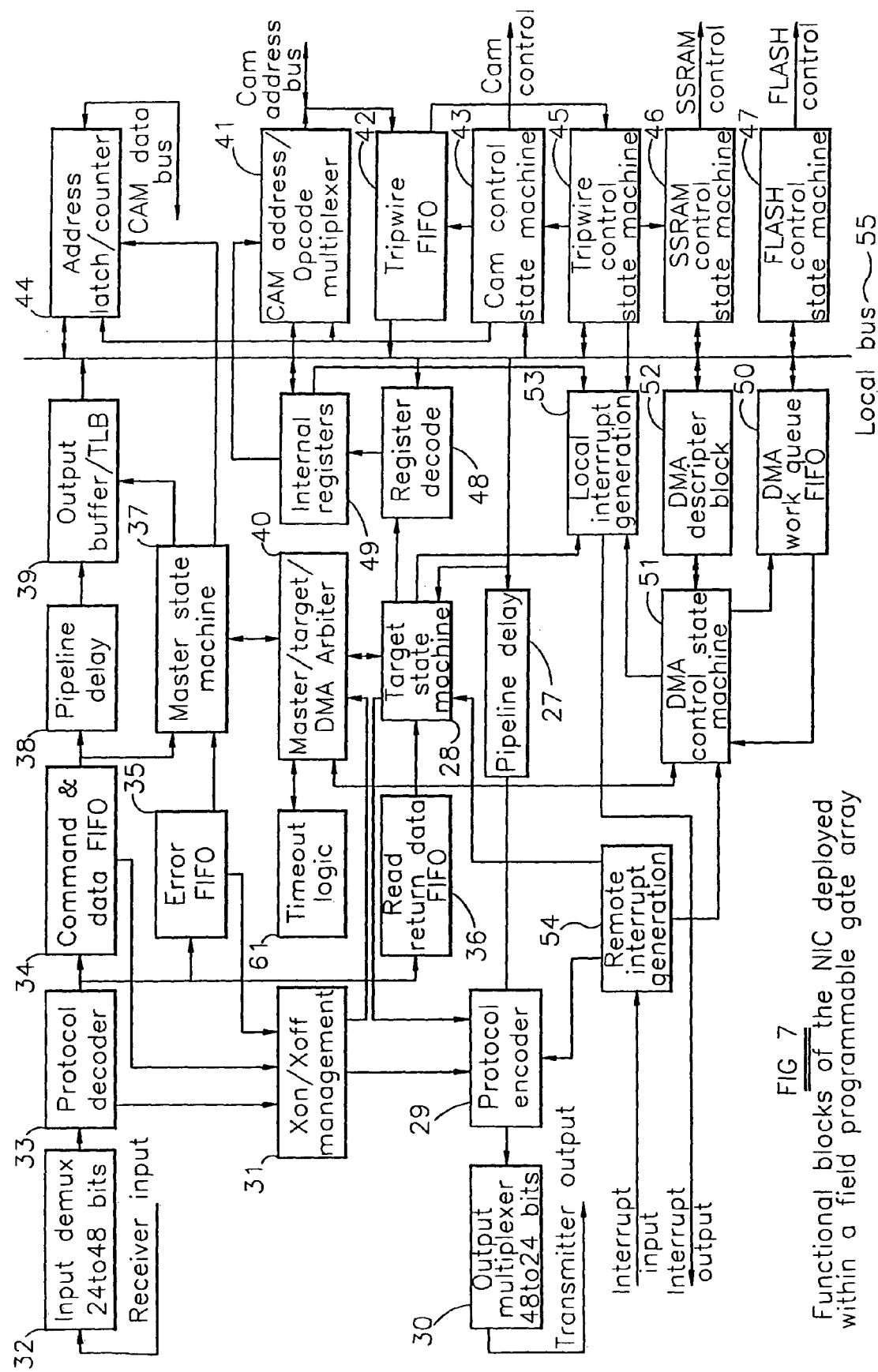
FIG. 7 shows the functional blocks of the NIC loyed within a Field Programmable Gate Array (FPGA)

Referring to FIG. 7, FPGA 13 is comprised of functional blocks 27-62. The working of the blocks will be explained by reference to typical data flows.

Operation of NIC 11 begins by computer 1 being started or reset. This operation causes the contents of boot ROM 21 to be loaded into FPGA 13 thereby programming the FPGA and, in turn, causing state machines 28, 37, 40, 43, 45, 46 and 47 to be reset.

Clock generator 25 begins running and provides a stable clock for the Tx serialiser 14. Clock buffer/divider 26 provides suitable clocks for the rest of the system. Serialiser 14 and de-serialiser 16 are reset and remain in a reset condition until communication with another node is established and a satisfactory receive clock is regenerated by de-serialiser 16.

PCI bridge 12 is also reset and loaded with the contents of boot ROM 22. Bridge 12 can convert (and re-convert at the target end) memory access cycles into I/O cycles and support legacy memory apertures, and as the rest of the NIC supports byte-enabled (byte-wide as well as word-wide) transfers, ROM 22 can be loaded with any PCI configuration space information, and can thus emulate any desired PCI card transparently to microprocessor 5.

Figure 9:
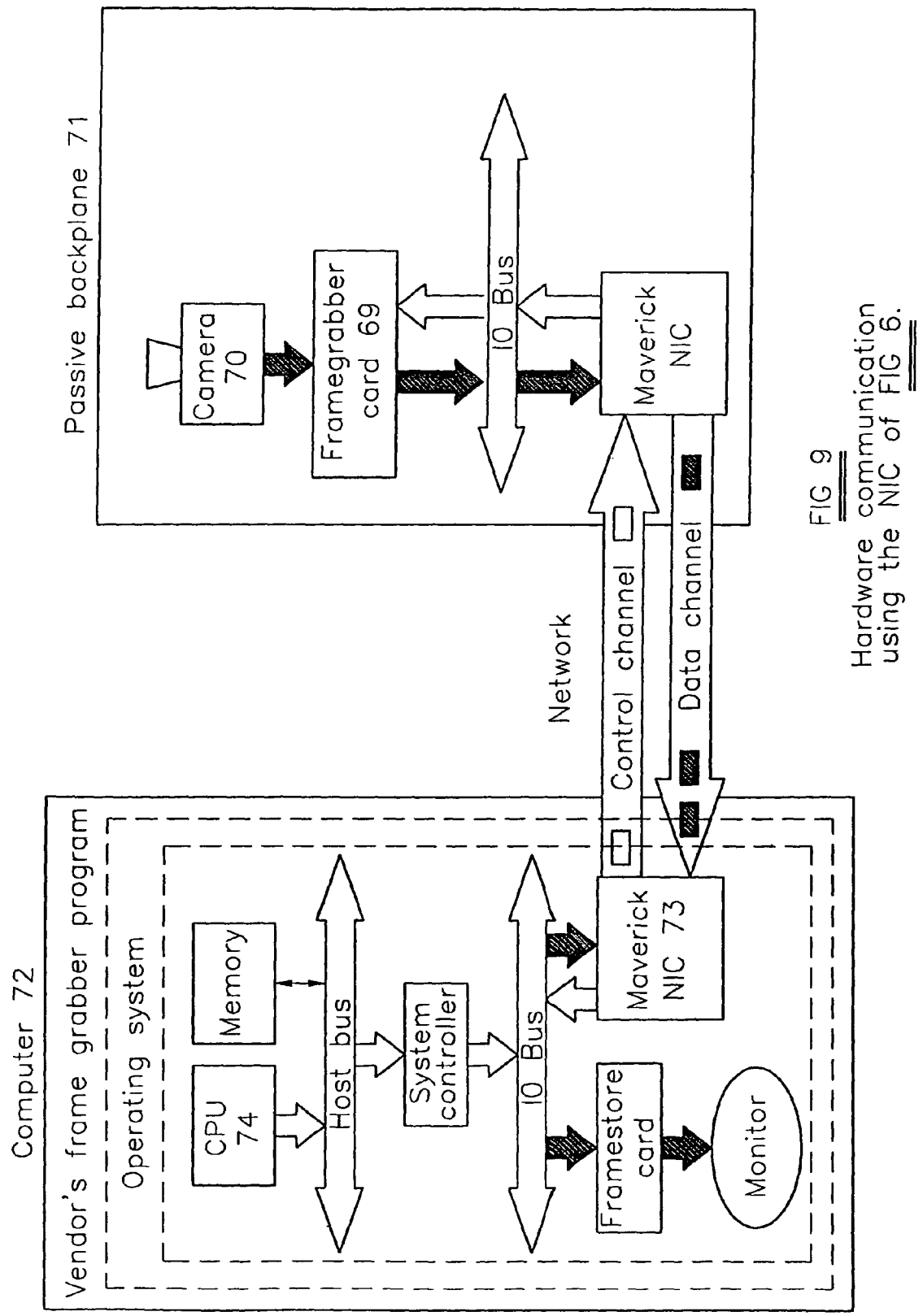
FIG. 9 shows schematically hardware communication according to an embodiment of the invention.

Immediately after reset, FLASH control state machine 47 runs and executes a simple microcode sequence stored in FLASH memory 24. Typically this allows the configuration space of another card such as 69 in FIG. 9 to be read, and additional information to be programmed into bridge 12. Programming of the FLASH memory is also handled by state machine 47 in conjunction with bridge 12.

Data transfer could in principle commence at this point, but arbiter 40 is barred from granting bus access to Master state machine 37 until a status bit has been set in one of the internal registers 49. This allows software to set up the Tripwires during the initialisation stage.

Writes from computer 1 to computer 2 take place in the following manner. Microprocessor 5 writes one or more words to an address location defined by system controller 8 to lie within NIC 11's address space. PCI to local bus bridge 12 captures these writes and turns them into local bus protocol (discussed elsewhere in this document). If the writes are within the portion of the address space determined to be within the local control aperture of the NIC by register decode 48, then the writes take place locally to the Content Addressable Memory appropriate register, (CAM), Static RAM (SRAM) or FLASH memory area. Otherwise target state machine 28 claims the cycles and forwards them to protocol encoder 29.

At the protocol encoder, byte-enable, parity data and control information are added first to an address and then to each word to be transferred in a burst, with a control bit marking the beginning of the burst and possibly also a control bit marking the end of the burst. The control bit marking the beginning of the burst indicates that address data forming the header of the data burst comprises the first "data" word of the burst.

Xon/Xoff-style management bits from block 31 are also added here. This protocol, specific to the serialiser 14 and de-serialiser 16 is also discussed elsewhere in this document.

Data is fed on from encoder 29 to output multiplexer 30, reducing the pin count for FPGA 13 and matching the bus width provided by serialiser 14. Serialiser 14 converts a 23-bit parallel data stream at 62 MHz to a 1-bit data stream at approximately 1.5 Gbit/s; this is converted to an optical signal by transceiver 15 and carried over a fibre-optic link to a corresponding transceiver 15 in NIC 56, part of computer 2. It should be noted that other physical layers and protocols are possible and do not limit the scope of the invention.

In NIC 56, the reconstructed digital signal is clock-recovered and de-serialised to 62 MHz by block 16. Block 32 expands the recovered 23 bits to 46 bits, reversing the action of block 30. Protocol decoder 33 checks that the incoming words have suitable sequences of control bits. If so, it passes address/data streams into command FIFO 34.

If the streams have errors, they are passed into error FIFO 35; master state machine 37 is stopped; and an interrupt is raised on microprocessor 57 by block 53. Software is then used to decipher the incoming stream until a correct sequence is found, whereupon state machine 37 is restarted.

When a stream arrives at the head of FIFO 34, master state machine 37 requests access to local bus 55 from arbiter 40. When granted, it passes first the address, then the following data onto local bus 55. Bridge 12 reacts to this address/data stream by requesting access to I/O bus 59 from system controller 58. When granted, it writes the required data into memory 60.

Reads of computer 2's memory 60 initiated by computer 1 take place in a similar manner. However, state machine 28 after sending the address word sends no other words, rather it waits for return data. Data is returned because master state machine 37 in NIC 56 reacts to the arrival of a read address by requesting a read of memory 60 via I/O bus 59 and corresponding local bus bridge 12. This data is returned as if it were write data flowing from NIC 56 to NIC 11, but without an initial address. Protocol decoder 33 reacts to this addressless data by routing it to read return FIFO 36, whereupon state machine 28 is released from its wait and the microprocessor 5's read cycle is allowed to complete. Should the address region be marked in NIC 56's bridge 12 as read-prefetchable, then a number of words are returned; if state machine 28 continues requesting data as if from a local bus burst read, then subsequent words are fulfilled directly from read return FIFO 36.

Should NIC 56 need to raise an interrupt on microprocessor 5, remote interrupt generator 54 causes state machine 28 to send a word from NIC 56 to a mailbox register in NIC 11's bridge 12. This will have been configured by software to raise an interrupt on microprocessor 5.

Inevitably, since the clocks 25 in NICs 11 and 56 will run at slightly different frequencies, there will be occasional overrun conditions. Where the command FIFO 34 exceeds a preprogrammed threshold value, an Xoff bit is sent to the corresponding protocol encoder 29. This bit causes the encoder to request that the sending state machine 28 stops, if necessary in mid burst. Logic in bridge 12 takes care of restarting the data burst when the corresponding Xon is received some time later. This logic calculates a new reference address for the unsent part of the data burst, using the reference address in the header of the whole data burst, and from a count of the number of data words which are sent before the transfer is stopped. As, in this embodiment, successive data words in a burst have successively incrementing destination addresses, the destination address of the first data word in the unsent part of the data burst can easily be calculated.

It is also possible that data may be read out of FIFO 34 faster than it is written in. In the event of this happening, master state machine 37 uses pipeline delay 38 to anticipate the draining of FIFO 34 and to terminate the data burst on local bus 55. It then uses the CAM address latch/counter 41 to restart the burst when more data arrives in FIFO 34. 'Tripwires' are triggering values, such as addresses, address ranges or other data, that are programmed into the NIC to be matched. Preferably, the trigging values used as tripwires are addresses. To meet timing requirements during address match cycles (as data flows through the NIC), three CAM devices are pipelined to reduce the match cycle time from around 70 nanoseconds to less than 30 nanoseconds.

The programming of Tripwires takes place by microprocessor 5 writing to PCI bridge 12 via system controller 8 and I/O bus 9. For the purpose of writing the Tripwire data, CAM array 18, 19, 20 appears like conventional RAM to microprocessor 5. For write cycles, this is done by CAM controller 43 generating suitable control signals to enable all three CAMs 18, 19, 20 for write access. Address latch 44 passes data to the CAMs unmodified. Address multiplexer 41 is arranged to pass local bus data out on the CAM address bus where it is latched at the moment addresses are valid on the local bus by latch 17. For read cycles, the process is similar, except that only CAM 18 is arranged to be enabled for read access, and address latch/counter 44 has its data flow direction reversed. So far as microprocessor 5 is concerned, it sees the expected data returned, since the memory arrays in CAMs 18, 19, 20 either contain the same data, or internal flags indicating that particular segments of the memory array have not yet been written and should not participate in match cycles.

Owing to the nature of the address/data bus being comprised of bursts of data, according to the preferred local protocol, the actual data stream cannot be used for monitoring address changes. A burst starts with the address of the first data word followed by an arbitrary number of data words. The address of the data words is implicit and increments from the start address. For normal inbound or outbound data transfer operations, address latch/counter 44 is loaded with the address of each new data burst, and incremented each time a valid data item is presented on internal local bus 55.

CAM control state machine 43 is arranged to enable each CAM 18, 19, 20 in sequence for a compare operation as each new address is output by latch/counter 44. This sequential enabling of the CAMs combined with their latching properties permits the access time for a comparison operation to be reduced by a factor of three (there being three CAMs in this implementation, other implementations being possible) from 70 ns to less than 30 ns. The CAM op-code for each comparison operation is output from one of the internal registers 49 via address multiplexers 41 and 17. The op-code is actually latched by address multiplexer 17 at the end of a read/write cycle, freeing the CAM address bus to return the index of matched Tripwires after comparison operations.

The Tripwire data (i.e. the addresses to be monitored) is written to sequential addresses in the CAM array. During the comparison operation (cycle), all valid Tripwires are compared in parallel with the address of the current data, be it inbound or outbound.

During the operation, masking operations may be performed, depending on the type of CAM used, allowing certain bits of the address to be ignored during the comparison. In this way, a Tripwire may actually represent a range of addresses rather than one particular address.

When the CAM array signals a match found (i.e. a Tripwire has been hit), it returns the address of the Tripwire (its offset in the CAM array) via the CAM address bus to the tripwire FIFO 42. Two courses of action are then possible, depending on how internal registers 49 have been programmed.

One course of action is for state machine 45 to request that an interrupt be generated by management logic 53. In this case, an interrupt is received by microprocessor 5, and software is run which services the interrupt. Normally this would involve microprocessor 5 reading the Tripwire address from FIFO 42, matching the address with a device-driver table, signalling the appropriate process, marking it runnable and rescheduling.

An alternative course of action is for state machine 45 to cause records to be read from SRAM 23 using state machine 46. A record comprises a number of data words; an address and two data words. These words are programmed by the software just before the Tripwire information is stored in the CAM. When a Tripwire match is made, the address in LATCH 44 is left shifted by two to form an address index for SRAM 23.

The first word is then read by state machine 46 and placed on local bus 55 as an address in memory 6. A fetch-and-increment operation is then performed by state machine 45, using the second and third words of the SRAM record to first AND and then OR, or else INCREMENT the data referred to in memory 6. A bit in the first word read by the state machine will indicate which operation it should take. In the case of an INCREMENT, the first data word also indicates the amount to increment by.

These alternatives enable the implementation of such primitives as an event counter incremented on tripwire matches, or the setting of a system reschedule flag. This mechanism enables multiple applications to process data without the requirement for hardware interrupts to be generated after receipt of each network packet.

While in the case of the interrupt followed by a Tripwire FIFO read, the device driver is presented with a list of endpoints which require attention. This list improves system performance as the device driver is not required to scan a large number of memory locations looking for such endpoints.

Since the device driver is not required to know where the memory locations which have been used for synchronisation are. It is also not required to have any knowledge or take part in the application level communication protocol. All communication protocol processing can be performed by the application and different applications are free to use differing protocols for their own purposes, and one device driver instance may support a number of such applications.

There is also a problem connected with programming a DMA engine that is addressed by an aspect of the invention. Conventional access to DMA engines is moderated either by a single system device driver, which requires (slow) context switches to access, or by virtualisation of the registers by system page fault, also requiring (multiple) context switches. The problem is that it is not safe for a user level application to directly modify the DMA engine registers or a linked list DMA queue, because this must be done atomically. In most systems, user applications cannot atomically update the DMA queue as they can be descheduled at any moment.

The invention addresses this problem by using hardware FIFO 50 to queue DMA requests from applications. Each application wanting to request DMA transfers sets up a descriptor, containing the start address and the length of the data to be transferred, in its local memory and posts the address of the descriptor to the DMA queue, whose address is common to all applications. This can be arranged by mapping a single page containing the physical address of the DMA queue as a write-only page into the address space of all user applications as they are initialised.

As soon as DMA work queue FIFO 50 is not empty, local bus 55 is not busy and the DMA engine in bridge 12 is also not busy, Master/Target/DMA arbiter 40 grants DMA state machine 51 access to local bus 55. Using the address posted by the application in FIFO 50, state machine 51 then uses bridge 12 to read the descriptor in memory 6 into the descriptor block 52. State machine 51 then posts the start address and length information held in block 52 into the DMA engine in bridge 12.

When the DMA process is complete, bridge 12 notifies state machine 51 of the completion. The state machine then uses data from descriptor block 52 to write back a completion descriptor in memory 6. Optionally, an interrupt can also be raised on microprocessor 5, although a Tripwire may already have been crossed to provide this notification early in order to minimise the delay bringing the relevant application back onto microprocessor 5's run queue. This is shown later in this document.

Should queue 50 be full, then state machine 51 writes a failure code back into the completion field of the descriptor that the application has just attempted to place on the queue. Thus the application does not need to read the status of the NIC in order to safely post a DMA request. All applications can safely share the same hardware posting address, and no time-consuming virtualisation or system device driver process is necessary.

Should any operation take longer than a preset number of PCI cycles, timeout logic 61 is activated to terminate the current cycle and return an interrupt through block 53.

Another aspect of the invention relates to the protocol which is preferably used by the NIC. This protocol uses an address and some additional bits in its header. This allows the transfer of variable length packets with simple routines for Segmentation and Reassembly (SAR) that are transparent to the sending or receiving codes. This is also done without the need to have an entire packet arrive before segmentation, reassembly or forwarding can occur, allowing the data to be put out on the ongoing link immediately. This enables data to traverse many links without significantly adding to the overall latency. The packets may be fragmented and coalesced on each link, for example between the NIC and a host I/O bus bridge, or between the NIC and another NIC. We term this cut-through routing and forwarding. In a network carrying a large number of streams, cut-through forwarding and routing enables small packets to pass through the network without any delays caused by large packets of other streams. While other network physical layers such as ATM also provide the ability to perform cut-through forwarding and routing, they do so at the cost of requiring all packets to be of a fixed small size.

Figure 8C:
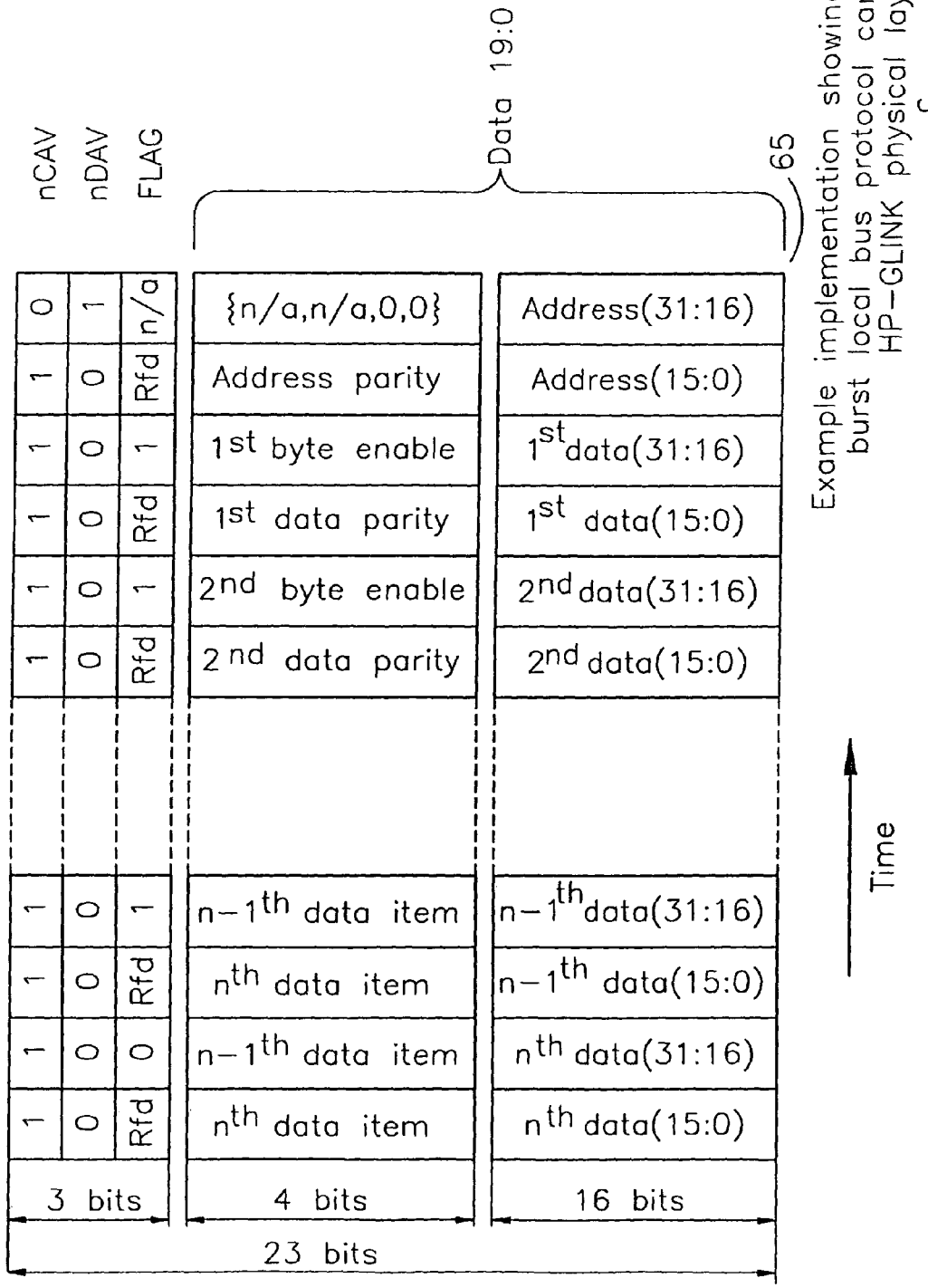
Figure 8D:
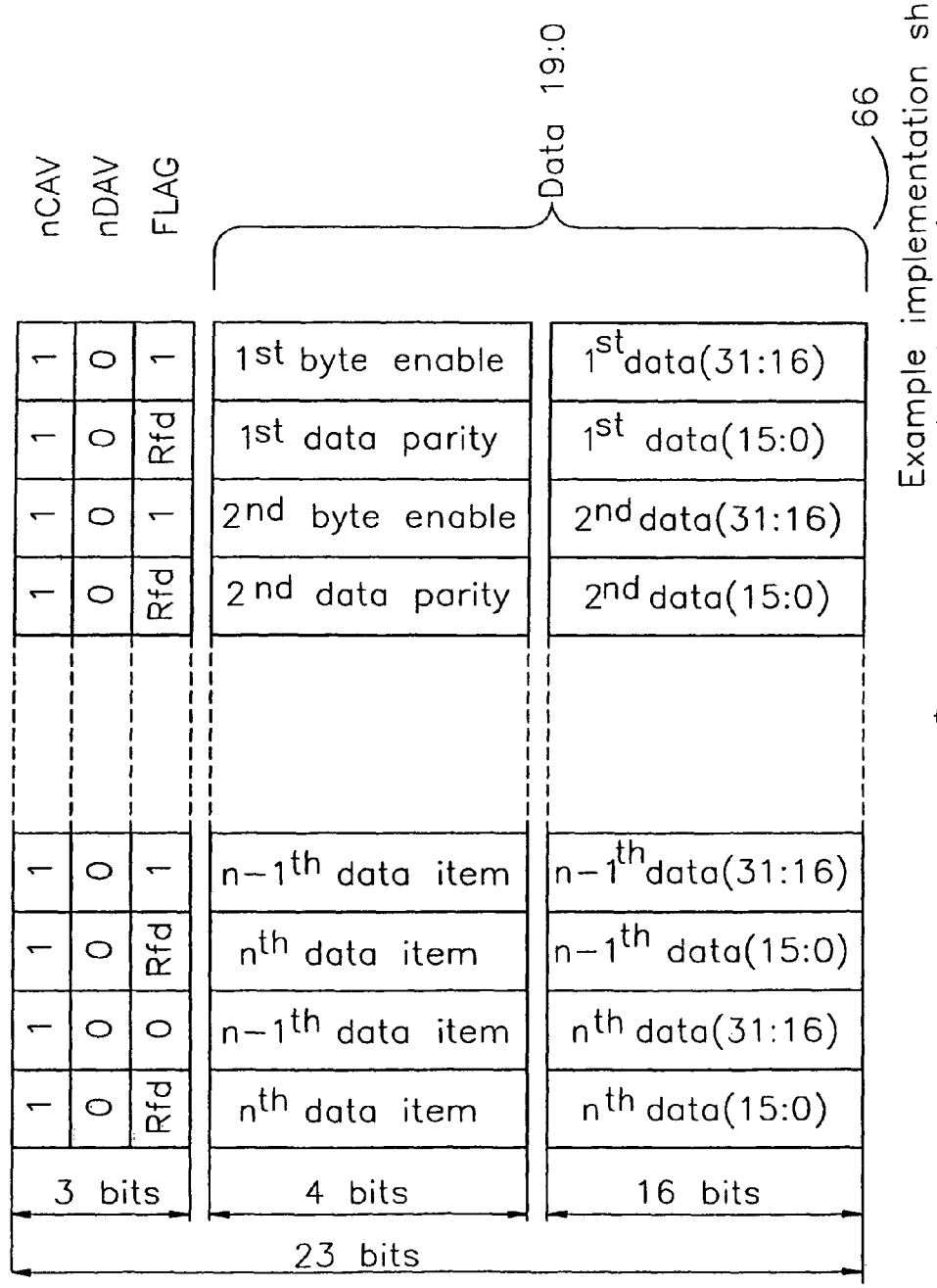

FIGS. 8*a*-*e* show an example of how this protocol has been implemented using the 23-bit data transfer capability of HP's GLINK chipset (serialiser 14 and de-serialiser 16). PCI to local bus bridge 12 provides a bus of 32 address/data bits, 4 parity bits and 4 byte-enable bits. It also provides an address valid signal (ADS) which signifies that a burst is beginning, and that the address is present on the address/data bus. The burst continues until a burst last signal (BLAST) is set active, signifying the end of a burst. It provides a read/write signal, and some other control signals that need not be transferred to a remote computer. FIG. 8A shows how this protocol is used to transfer an n data word burst 63. The data traffic closely mirrors that used on the PCI bus, but uses fewer signals.

The destination address always precedes each data burst. Therefore, the bursts can be of variable size, can be split or coalesced, by generating fresh address words, or by removing address words where applicable. In the preferred embodiment, sequential data words are destined for sequentially incrementing addresses. However, data words having sequentially decrementing addresses might also be used, or any other pattern of addresses may be used so long as it remains easy to calculate. So far as the endpoints are concerned, exactly the same data is transferred to exactly the same locations. The benefits are that packets can be of any size at all, reducing the overhead of sending an address; packets can be split (and addresses regenerated to continue) by network switches to provide quality of service, and receivers need not wait for a complete packet to arrive to begin decoding work.

Also, the destination address given in the header may be for the 'nth' data word in the burst, rather than for the first, although using the first data word address is preferred.

FIG. 8*b* shows how the protocol of FIG. 8*a* is transcribed onto the G-LINK physical layer. The first word in any packet contains an 18-bit network address. Each word of 63 is split into two words in 64; the lower 16 bits carry high and low addresses or data, corresponding to the address/data bus; the next 4 bits carry either byte enables or parity data. During the address phase, the byte enable field (only 2 bits of which are available, owing to the limitations of G-LINK) is used to carry a 2-bit code indicating read, write or escape packet use. Escape packets are normally used to carry diagnostic or error information between nodes, or as a means of carrying the Xon/Xoff-style protocol when no other data is in transit. The G-LINK nCAV signal corresponds to the ADS signal of 63; nDAV is active throughout the rest of the burst and the combination of NDAV inactive and nCAV inactive signals the end of a burst, or nCAV active indicates the immediate beginning of another burst.

FIG. 8*c*, shows a read data burst 65; this is the same as a write burst 64, except data bit 16 is set to O. On the outbound request, the data field contains the network address for the read data to be returned to. When the data for a read returns 66, it travels like a write burst, but is signified by there only being one nCAV active (signifying the network address) along with the first word. An additional bit, denoted FLAG in FIG. 8*c*, is used to cary Xon/Xoff style information when a burst is in progress. It is not necessary therefore to break up a burst in order to send an Escape packet containing the Xon/Xoff information. The FLAG hit also serves as an additional end of packet indicator.

In FIG. 8*c*, 67,68 shows an escape packet; after the network address, this travels with 68 or without 67 a payload as defined by data bit 16 in the first word of the burst.

In a full networked implementation, an extra network address word may precede each of these packets. Other physical layer or network layer solutions are possible, without compromise to this patent application, including fibre channel parts (using 8B/10B encoding) and conventional networks such as ATM or even Ethernet. The physical layer only needs to provide some means of identifying data from non-data and the start of one burst from the end of a previous one.

A further aspect of the invention relates to the distribution of hardware around a network. One use of a network is to enable one computer to access a hardware device whose location is physically distant. As an example, consider the situation shown in FIG. 9, where it is required to display the images viewed by the camera 70, (connected a frame-grabber card 69) on the monitor which is, in turn, connected to computer 72. The NIC 73 is programmed from Boot ROM 22 to present the same hardware interface as that of the frame-grabber card 69. Computer 72 can be running the standard application program as provided by a third party vendor which is unaware that system has been distributed over a network. All control reads and writes to the frame-grabber 69, are transparently forwarded by the NIC 73, and there is no requirement for an extra process to be placed in the data path to interface between the application running on CPU 74 and the NIC 73. Passive PCI I/O back-plane 71, requires simply a PCI bus clock and arbiter i.e., no processor, memory or cache. These functions can be implemented at very low cost.

The I/O buses are conformant to PCI Local Bus Specification 2.1. This PCI standard supports the concept of a bridge between two PCI buses. It is possible to program the NIC 73 to present the same hardware interface as a PCI bridge between Computer 72 and passive back-plane 71. Such programming would enable a plurality of hardware devices to be connected to back-plane 71 and controlled by computer 72 without the requirement for additional interfacing software. Again, it should be clear that the invention will support both general networking activity and this remote hardware communication, simultaneously using a single network card.

Figure 10:
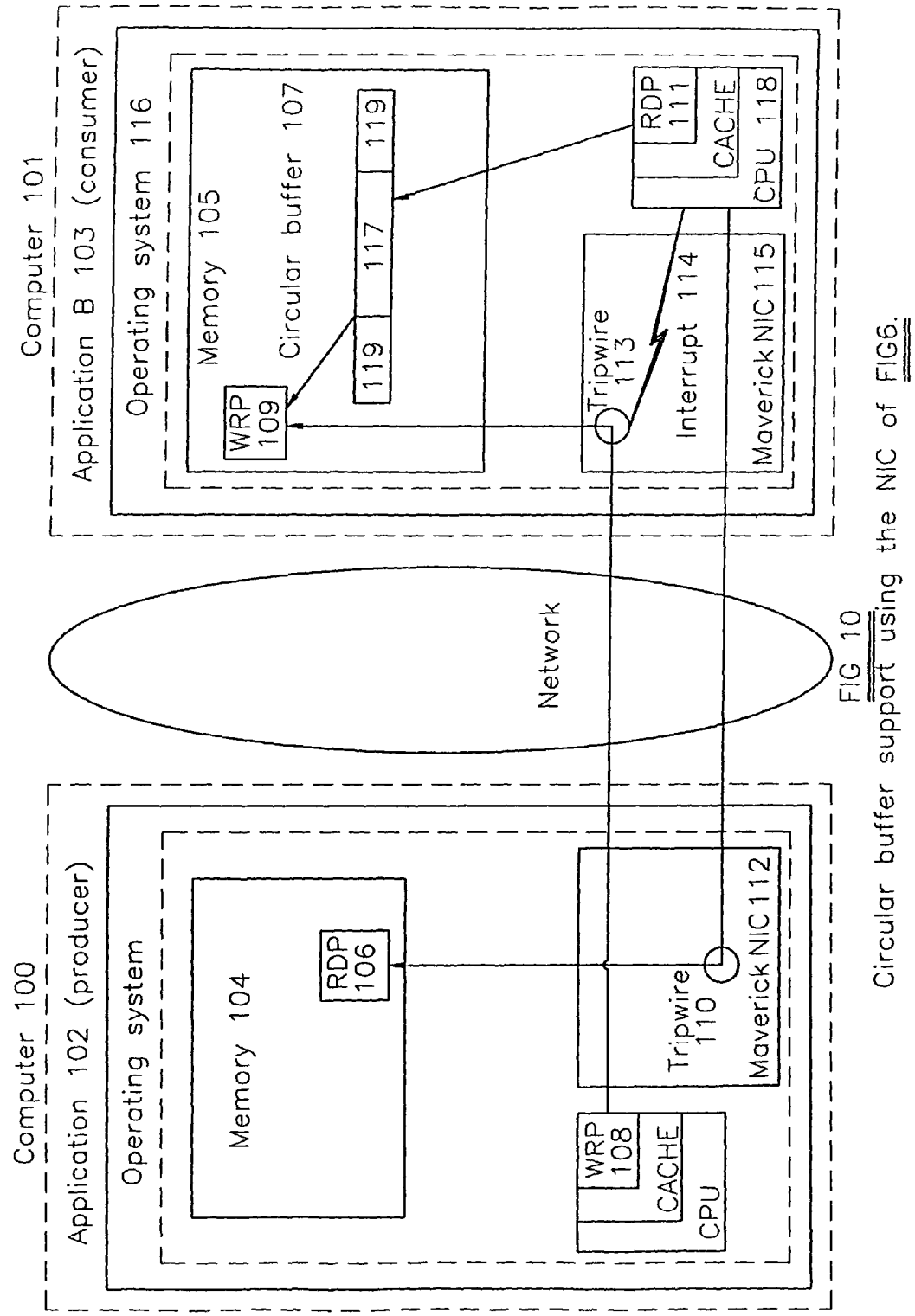
FIG. 10 shows schematically a circular buffer abstraction according to one embodiment of the invention.

A circular buffer abstraction will now be discussed as an example of the use of the NIC by an application. The circular buffer abstraction is designed for applications which require a producer/consumer software stream abstraction, with the properties of low latency and high bandwidth data transmission. It also has the properties of responsive flow control and low buffer space requirements. FIG. 10 shows a system comprising two software processes, applications 102 and 103, on different computers 100, 101.

Application 102 is producing some data. Application 103 is awaiting the production of data and then consuming it. The circular buffer 107, is composed of a region of memory on Computer 101 which holds the data and two memory locations—RDP 106 and WRP 109. WRP 109 contains the pointer to the next byte of data to be written into the buffer, while RDP 106 contains the pointer to the last byte of data to be read from the buffer.

When the circular buffer is empty, then WRP is equal to RDP+1 modulo wrap-around of the buffer. Similarly, the buffer is full when WRP is equal to RDP−1. There are also private values of WRP 108 and RDP 111 in the caches of computer 100 and computer 101 respectively. Each computer 100,101 may use the value of WRP and RDP held in its own local cache memory to compute how much data can be written to or read from the buffer at any point in time, without the requirement for communication over the network.

When the circular buffer 107 is created, the producer sets up a Tripwire 110, which will match on a write to the RDP pointer 106, and the consumer sets up a Tripwire 113, which will match on a write to the WRP pointer 109.

If consumer application 103 attempts to read data from the circular buffer 107, it first checks to see if the circular buffer is empty. If so, application 103 must wait until the buffer is not empty, determined when WRP 109 has been seen to be incremented.

During this waiting period, application 103 may either block, requesting an operating system reschedule, or poll the WRP 109 pointer.

If producer application 102 decides to write to the circular buffer 107, it may do so while the buffer is not full. After writing some data, application 102 updates its local cached value of WRP 108, and writes the updated value to the memory location 109, in computer 101. When the value of WRP 109, is updated, the Tripwire 113, will match as has been previously described.

If consumer application 103 is not running on CPU 118 when some data is written into the buffer and Tripwire 113 matches, NIC 115 will raise a hardware interrupt 114. This interrupt causes CPU 118 to run device driver software contained within operating system 118. The device driver will service the interrupt by reading the tripwire FIFO 42 on NIC 115 and determine from the value read, the system identifier for application 103. The device driver can then request that operating system 118, reschedule application 103. The device driver would then indicate that the tripwire 113 should not generate a hardware interrupt until application 103 has been next descheduled and subsequently another Tripwire match has occurred.

Note that the system identifier for each running application is loaded into internal registers 49, each time the operating system reschedules. This enables the NIC to determine the currently running application, and so make the decision whether or not to raise a hardware interrupt for a particular application given a Tripwire match.

Hence, once consumer application 103 is again running on the processor further writes to the circular buffer 107, by application 102, may occur without triggering further hardware interrupts. Application 103 now reads data from the circular buffer 107. It can read data until the buffer becomes empty (detected by comparing the values of RDP and WRP 111,109). After reading, application 102 will update its local value of RDP 111 and finally writes the updated value of RDP to memory location 106 over the network.

If producer application 102 had been blocked on a full buffer, this update of RDP 106 would generate a Tripwire match 110, resulting in application 102, being unblocked and able to write more data into the buffer 107.

In normal operation, application 102 and application 103 could be operating on different parts of the circular buffer simultaneously without the need for mutual exclusion mechanisms or Tripwire.

The most important properties of the data structure are that the producer and the consumer are able to process data without hindrance from each other and that flow control is explicit within the software abstraction. Data is streamed through the system. The consumer can remove data from the buffer at the same time as the producer is adding more data. There is no danger of buffer over-run, since a producer will never transmit more data than can fit in the buffer.

The producer only ever increments WRP 108, 109 and reads RDP 106, and the consumer only ever increments RDP 106, 111, and reads WRP 109. Inconsistencies in the values of WRP and RDP seen by either the producer or consumer either cause the consumer to not process some valid data (when RDP 106 is inconsistent with 111), or the producer to not write some more data (when WRP 109 is inconsistent with 108), until the inconsistency has been resolved. Neither of these occurrences cause incorrect operation or performance degradation so long as they are transient.

It should also be noted that on most computer architectures, including the Alpha AXP and Intel Pentium ranges, computer 100 can store the value of the RDP 106 pointer in its processor cache, since the producer application 102 only reads the pointer 106. Any remote writes to the memory location of the RDP pointer 106 will automatically invalidate the copy in the cache causing the new value to be fetched from memory. This process is automatically carried out and managed by the system controller 8. In addition, since computer 101 keeps a private copy of the RDP pointer 111 in its own cache, there is no need for any remote reads of RDP pointer values during operation of the circular buffer. Similar observations can also be made for the WRP pointer 109 in the memory of computer 101 and the WRP pointer 108 in the cache of computer 100. This feature of the buffer abstraction ensures that high performance and low latency are maintained. Responsive application level flow-control is possible because the cached pointer values can be exposed to the user-level applications 102, 103.

Figure 11:
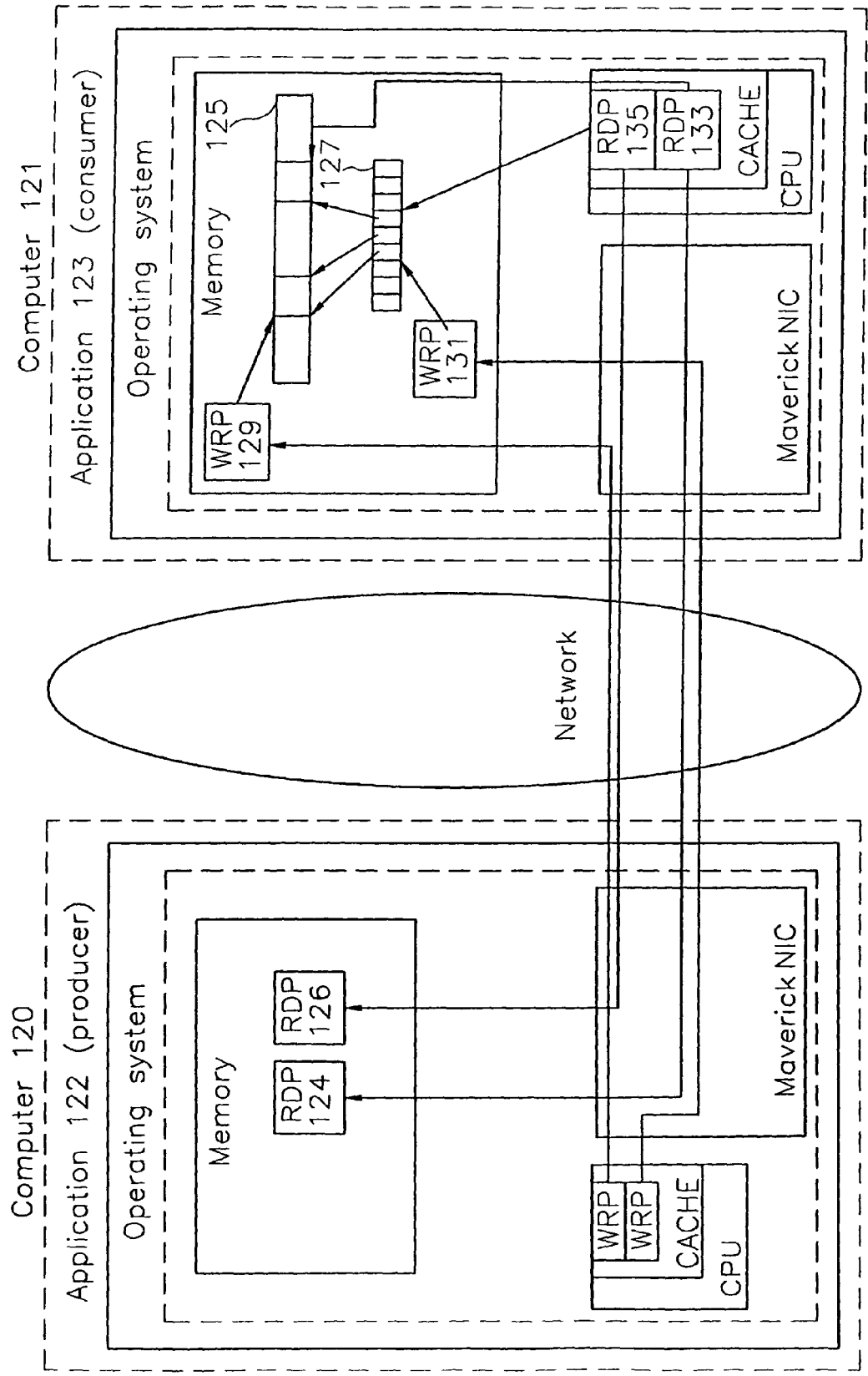
FIG. 11 shows schematically the system support for discrete message communication using circular buffers.

A further enhancement to the above arrangement can be used to provide support for applications which would like to exchange data in discrete units. As shown in FIG. 11, and in addition to the system described in FIG. 10. The system maintains a second circular buffer 127, of updated WRP 129 values corresponding to buffer 125. This second buffer 127 is used to indicate to a consumer how much data to consume in order that data be consumed in the same discrete units as it were produced. Note that circular buffer 125 contains the data to be exchanged between the applications 122 and 123.

The producer, application 122 writes data into buffer 125, updating the pointer WRP 129, as previously described. Once data has been placed in buffer 125, application 122 then writes the new value of the WRP 129 pointer into buffer 127. At the same time it also manipulates the pointer WRP 131. If either of these write operations does not complete then the application level write operation is blocked until some data is read by the consumer application 123. The Tripwire mechanism can be used as previously described, for either application to block on either a full or empty buffer pair.

The consumer application 123 is able to read from both buffers 125 and 127, in the process updating the RDP pointers 133, 135 in its local cache and RDP pointers 124, 126 over the network in the manner previously described. A data value read from buffer 127 indicates an amount of data, which had been written into buffer 125. This value may be used by application level or library software 123, to consume data from buffer 125 in the same order and by the same discrete amounts as it were produced by application 122.

Figure 12:
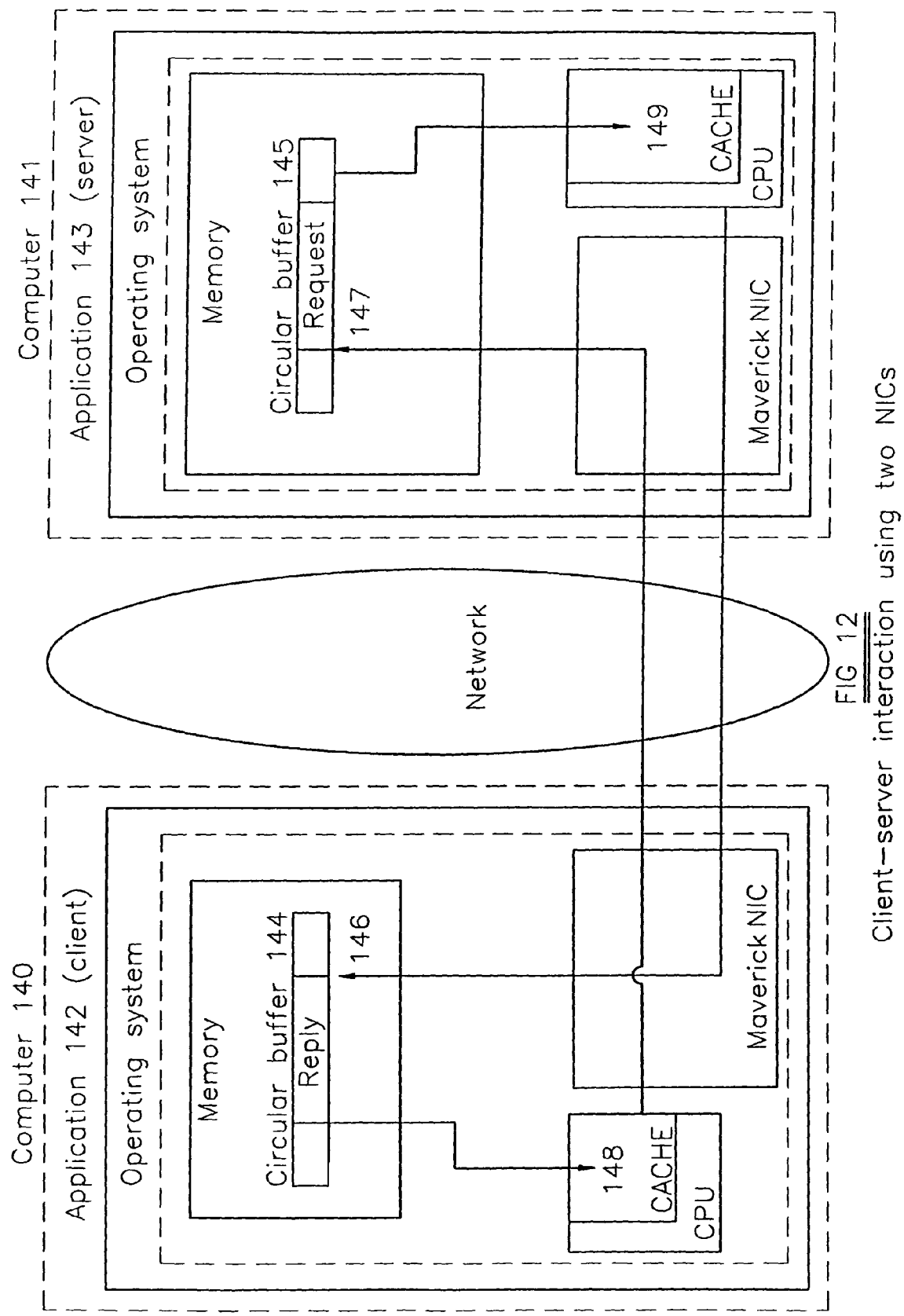
FIG. 12 shows a client-server interaction according to an embodiment of the invention.

The NIC can also be used to directly support a low latency Request/Response style of communication, as seen in client/server environments such as Common Object Request Broker Architecture (CORBA) and Network File System (NFS) as well as transactional systems such as databases. Such an arrangement is shown in FIG. 12, where application 142 on computer 140 acts as a client requesting service from application 143 on computer 141, which acts as a server. The applications interact via memory mappings using two circular buffers 144 and 145, one contained in the main memory of each computer. The circular buffers operate as previously described, and also can be configured to transfer data in discrete units as previously described.

Application 142, the client, writes a request 147 directly into the circular buffer 145, via the memory mapped connection(s), and waits for a reply by waiting on data to arrive in circular buffer 144. Most Request/Response systems use a process known as marshalling to construct the request and use an intermediate buffer in memory of the client application to do the marshalling. Likewise marshalling is used to construct a response, with an intermediate buffer being required in the memory of the server application. Using the present invention, marshalling can take place directly into the circular buffer 145 of the server as shown. No intermediate storage of the request is necessary at either the client or server computers 140, 141.

The server application 143 notices the request (possibly using the Tripwire mechanism) and is able to begin unmarshalling the request as soon as it starts to arrive in the buffer 145. It is possible that the server may have started to process the request 149 while the client is still marshalling and transmitting, thus reducing latency in the communication.

After processing the request, the server writes the reply 146 directly into buffer 144, unblocking application 142 (using the Tripwire mechanism), which then unmarshalls and processes the reply 148. Again, there is no need for intermediate storage, and unmarshalling by the client may be overlapped with marshalling and transmission by the server.

Figure 1:
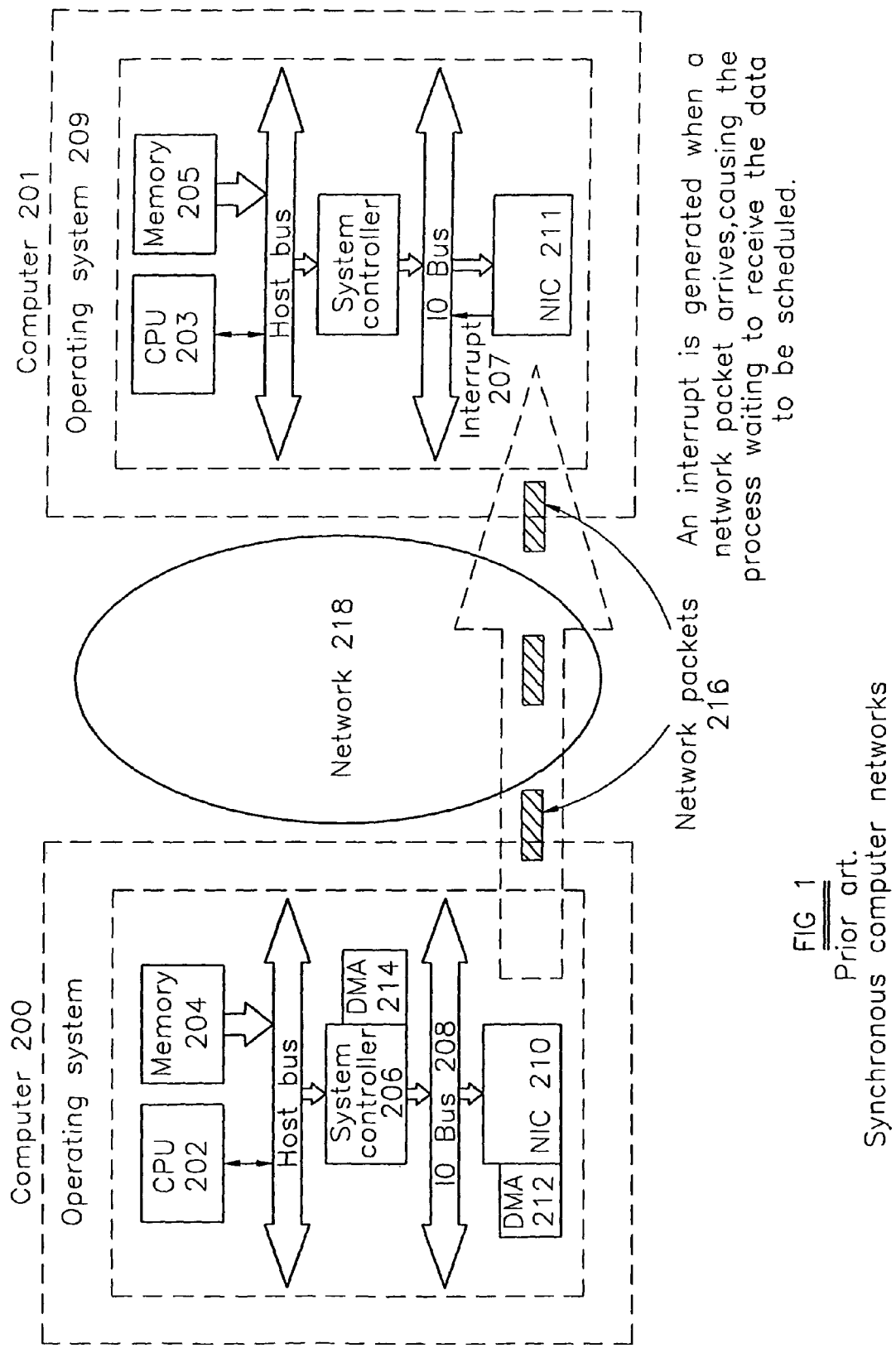
FIG. 1 illustrates example synchronous computer networks.
Figure 2:
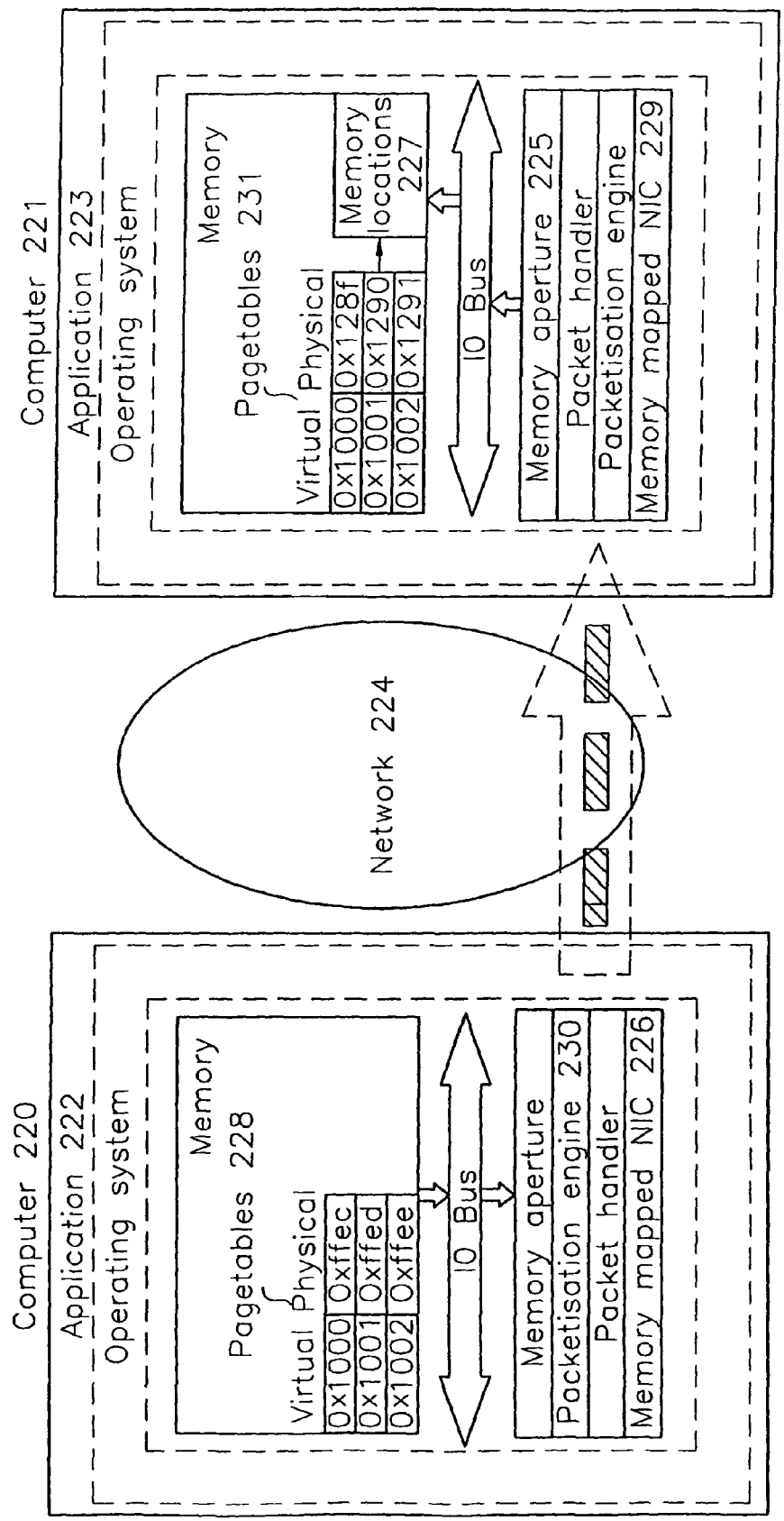
FIG. 2 is a block diagram of an example memory mapped network.
Figure 3:
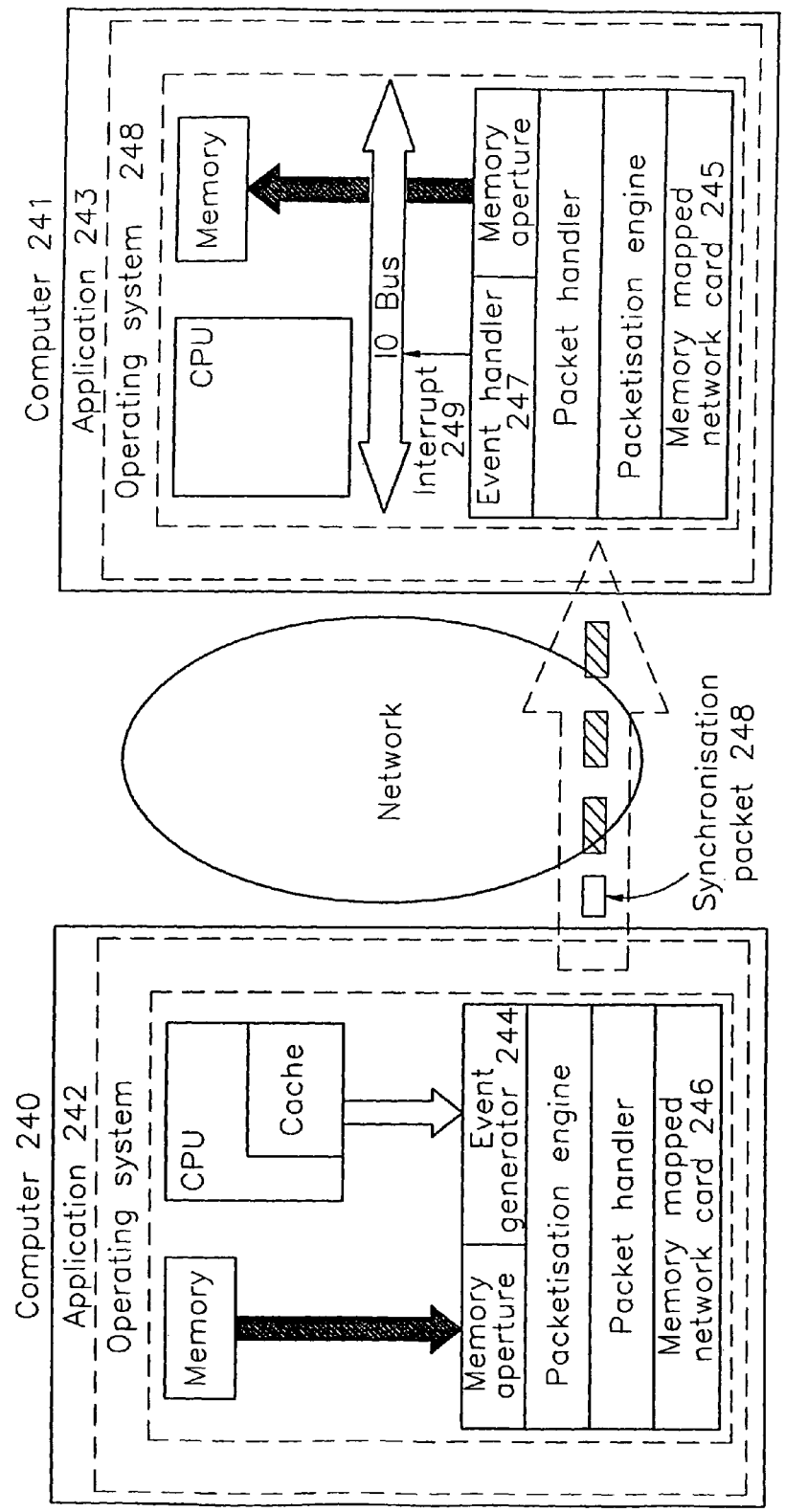
FIG. 3 is a block diagram illustrating an example sychronisation in an example memory mapped network.
Figure 4:
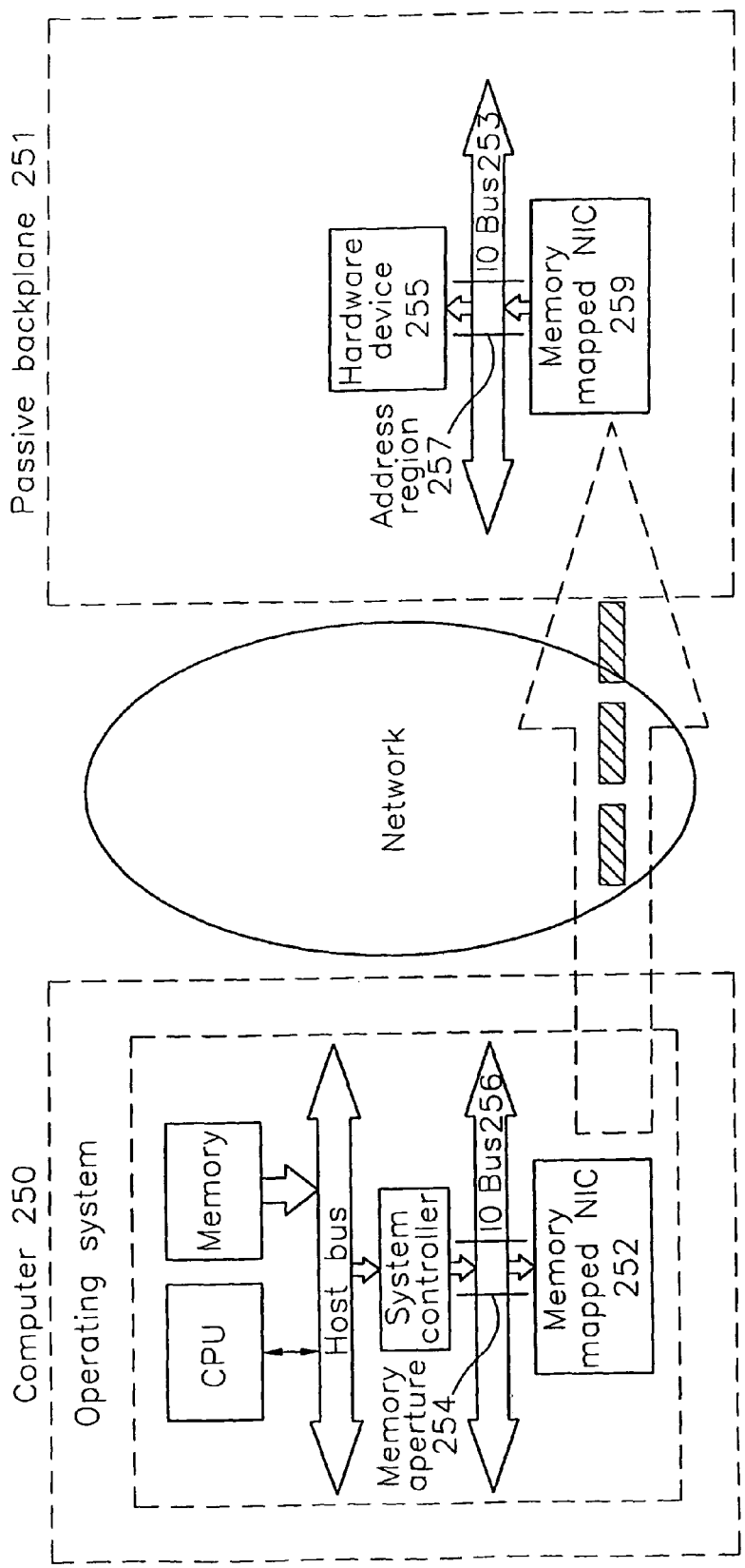
FIG. 4 is a block diagram illustrating example hardware communication over an example memory mapped network.

A further useful and novel property of a Request/Response system built using the present invention, is that data may be written into the buffer both from software running on a CPU, or any hardware device contained in the computer system. FIG. 1S shows a Request/Response system which is a file serving application. The client application 262 writes a request 267 for some data held on disks controlled by 271. The server application 263 reads 269 and decodes the request from its circular buffer 265 in the manner previously described. It then performs authentication and authorisation on the request according to the particular application.

If the request for data is accepted, the server application 263 uses a two-part approach to send its reply. Firstly, it writes, into the circular buffer 264, the software generated header part of the reply 266. The server application 263 then requests 273 that the disk controller 271 send the required data part of the reply 272 over the network to circular buffer 264. This request to the disk controller takes the form of a DMA request, with the target address being an address on I/O bus 270 which has been mapped onto circular buffer 264.

Note that the correct offset is applied to the address such that reply data 272 from the disk is placed immediately following the header data 266.

Before initiating the request 273, the server application 263 can ensure that sufficient space is available in the buffer 264 to accept the reply data. Further, it is not necessary for the server application 263 to await the completion request 273. It is possible for the client application 262 to have set a Tripwire 274 to match once the reply data 272 has been received into buffer 264. This match can be programmed to increment the WRP pointer associated with buffer 264, rather than requiring application 263 to increment the pointer as previously described. If a request fails, then the client application 262 level timeout mechanism would detect and retry the operation.

It is also possible for the client application 262 to arrange that reply data 272 be placed in some other data structure, (such as a kernel buffer-cache page), through manipulation of 169 and 167 as described later. This is useful when 264 is not the final destination of the rept data, so preventing a final memory copy operation by the client. Server application 263 would be unaware of this client side optimisation.

By use of this mechanism, the processing load on the server is reduced. The requirement for the server application to wait for completion of its disk requests is removed. The requirement for high bandwidth streams of reply data to pass through the server's system controller, memory, cache or CPU is also removed.

Figure 13:
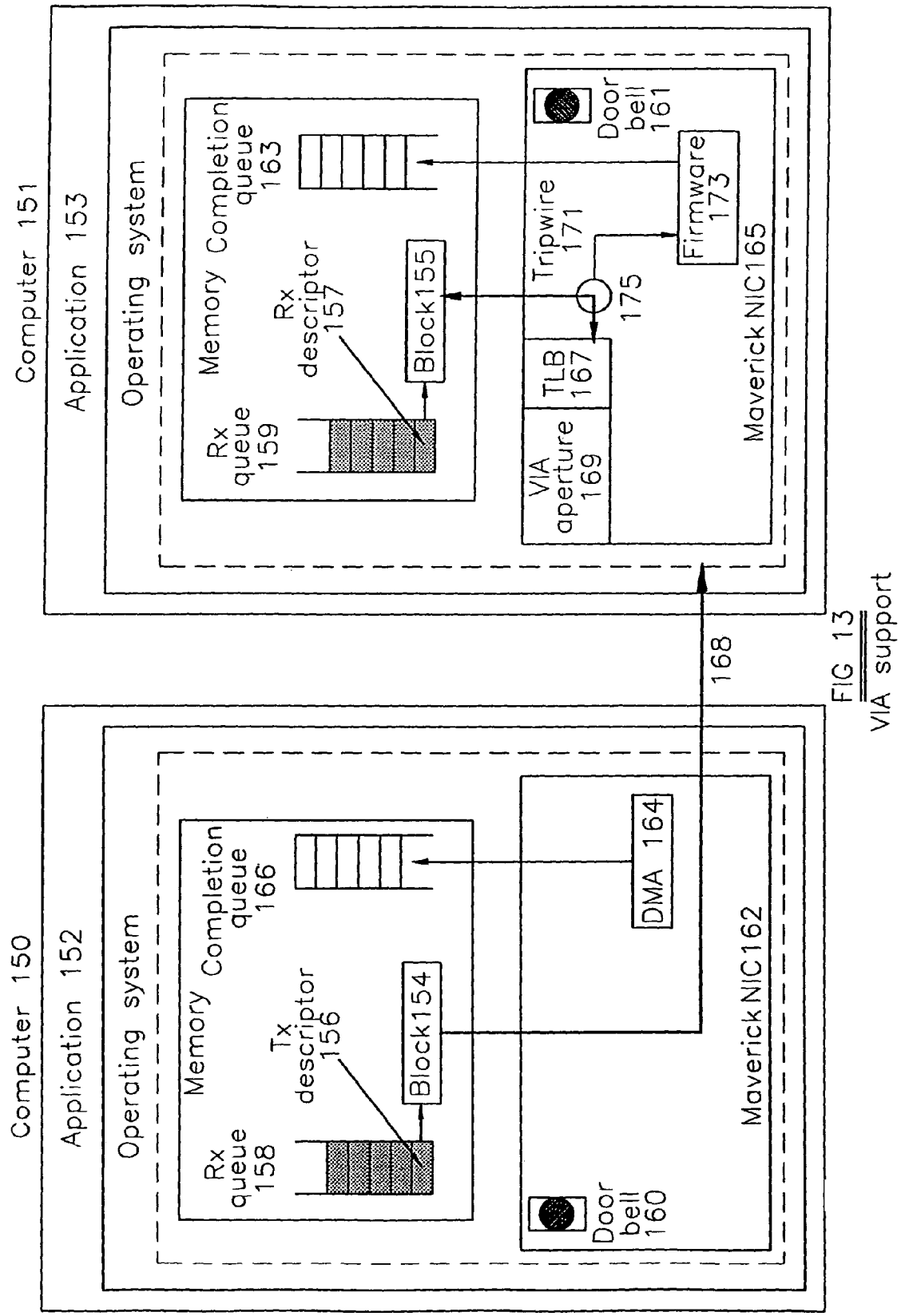
FIG. 13 shows how the system of the present invention can support VIA.

As previously stated, the NIC of the present invention could be used to support the Virtual Interface Architecture (VIA) Standard. FIG. 13 shows two applications communicating using VIA. Application 152 sends data to application 153, by first writing the data to be sent into a region of its memory, shown as block 154. Application 152 then builds a transmit descriptor 156, which describes the location of block 154 and the action required by the NIC (in this case data transmission). This descriptor is then placed onto the TxQueue 158, which has been mapped into the user-level address-space of application 152. Application 152 then finally writes to the doorbell register 160 in the NIC 162 to notify the NIC that work has been placed on the TxQueue 158.

Once the doorbell register 160 has been written, the NIC 162 can determine, from the value written, the address in physical memory of the activated TxQueue 158. The NIC 152 reads and removes the descriptor 156 from the TxQueue 158, determines from the descriptor 156, the address of data block 154 and invokes a DMA 164 engine to transmit the data contained in block 154. When the data is transmitted 168, the NIC 162 places the descriptor 156 on a completion queue 166, which is also mapped into the address space of application 152, and optionally generates a hardware interrupt. The application 152 can determine when data has been successfully sent by examining queue 166.

When application 153 is to receive data, it builds a receive descriptor 157 describing where the incoming data should be placed, in this case block 155. Application 153 then places descriptor 157 onto RxQueue 159, which is mapped into its user-level address-space.

Application 153 then writes to the doorbell register 161 to indicate that its RXQueue 159 has been activated. It may choose to either poll its completion queue 163, waiting for data to arrive, or block until data has arrived and a hardware interrupt generated.

The NIC 165 in computer 151 services the doorbell register 161 write by first removing the descriptor 157 from the RxQueue 159. The NIC 165 then locates the physical pages of memory corresponding to block 155 and described by the receive descriptor 157. The VIA standard allows these physical pages to have been previously locked by application 153 (preventing the virtual memory system moving or removing the pages from physical memory). However, the NIC is also capable of traversing the page-table structures held in physical memory and itself locking the pages.

The NIC 165 continues to service the doorbell register write and constructs a Translation Look-aside (TLB) entry 167 located in SRAM 23. When data arrives corresponding to a particular VIA endpoint, the incoming address matches an aperture 169 in the NIC, which has been marked as requiring a TLB translation. This translation is carried out by state machine 46 and determines the physical memory address of block 155.

The TLB translation, having been previously set up, occurs with little overhead and the data is written 175 to appropriate memory block 155. A Tripwire 171 will have been arranged (when the TLB 167 entry was constructed) to match when the address range corresponding to block 155 is written to. This Tripwire match causes the firmware 173 (implemented in state machine 51) to place the receive descriptor 157 onto completion queue 163 to invalidate the TLB mapping 167 and optionally generate an interrupt. If the RxQueue 159 has been loaded with other receive descriptors, then the next descriptor is taken and loaded into the TLB as previously described. If application 153 is blocked waiting for data to arrive, the interrupt generated will result, (after a device driver has performed a search of all the completion queues in the system), in application 153 being re-scheduled. If there is no TLB mapping for the VIA Aperture addresses, or the mapping is invalid, an error is raised using an interrupt. If the NIC 165 is in the process of reloading the TLB 167 when new data arrives, then hardware flow control mechanism 31 is used to control the data until a path to the memory block in computer 151 has been completed.

As an optional extension to the VIA standard, the NIC could also respond to Tripwire match 171 by placing an index on Tripwire FIFO 42, which could enable the device driver to identify the active VIA endpoint without searching all completion queues in the system.

This method can be extended to provide support for I20 and the forthcoming Next Generation I/O (NGIO) standard. Here, the transmit, receive and completion queues are located on the NIC rather than in the physical memory of the computer, as is currently the case for the VIA standard.

Figure 14:
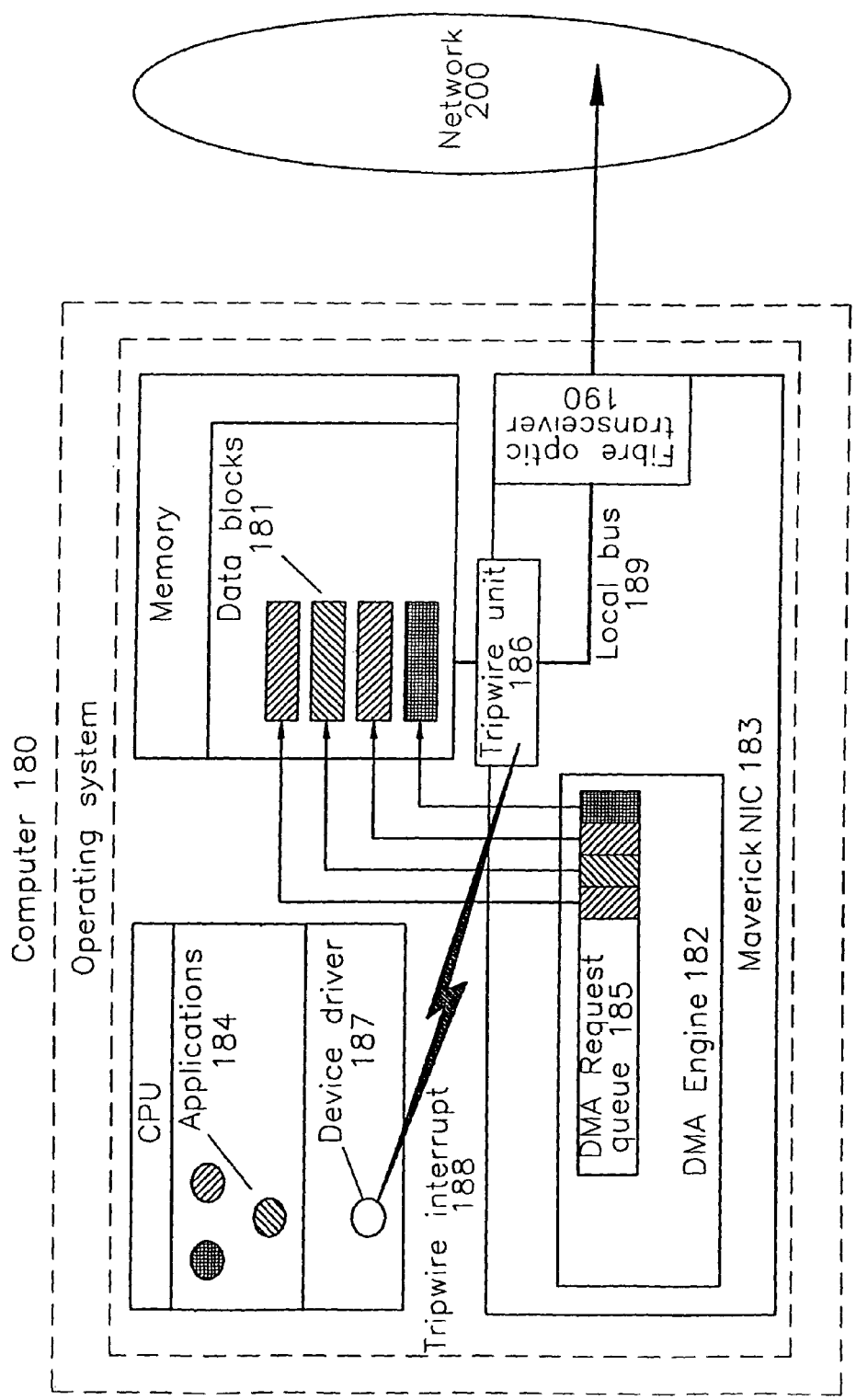
FIG. 14 shows outgoing stream synchronisation according to an embodiment of the present invention.
Figure 15:
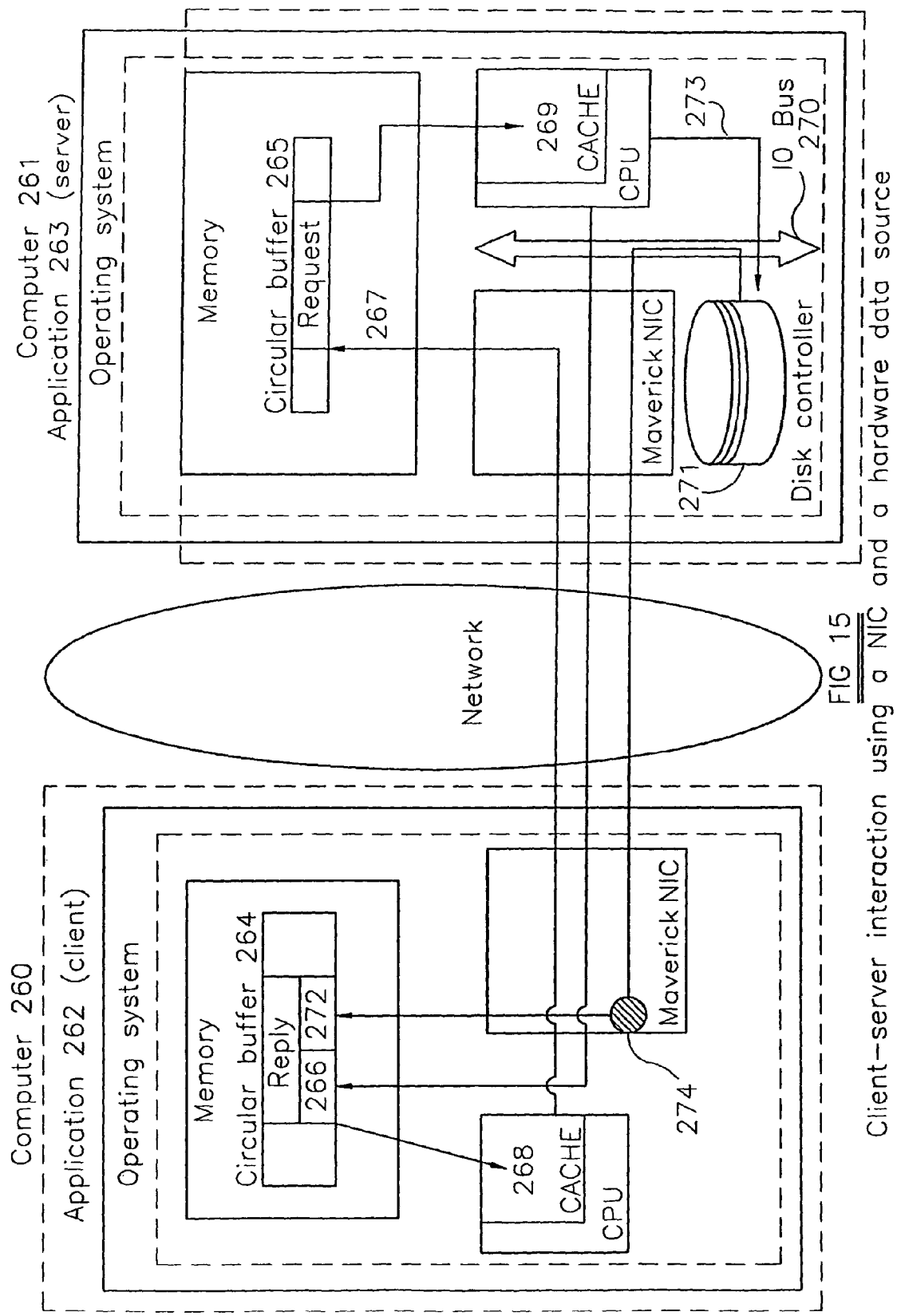
FIG. 15 shows a client-server interaction according to an embodiment of the invention using a hardware data source.

As mentioned previously, another aspect of this invention is its use in providing support for the outbound streaming of data through the NIC. This setup is described in FIG. 14. It shows a Direct Memory Access (DMA) engine 182 on the NIC 183, which has been programmed in the manner previously described by a number of user-level applications 184. These applications have requested that the NIC 183 transfer their respective data blocks 181 through the NIC 183, local bus 189, fibre-optic transceiver 190 and onto network 200. After each application has placed its data transfer request onto the DMA request queue 185, it blocks, awaiting a re-schedule, initiated by device driver 187. It can be important that the system maintains fair access between a large number of such applications, especially under circumstances where an application requires a strict periodic access to the queue, such as an application generating a video stream.

Data transferred over the network by the DMA engine 182, traverses local bus 189, and is monitored by the Tripwire unit 186. This takes place in the same manner as for received data, (both transmitted and received data pass through the NIC using the same local bus 55).

Each application, when programming the DMA engine 182 to transmit a data block, also constructs a Tripwire which is set to match on an address in the data block. The address to match could indicate that all or a certain portion of the data has been transmitted. When this Tripwire fires and causes a hardware interrupt 188, the device driver 187 can quickly determine which application should be made runnable. By causing a system reschedule, the application can be run on the CPU at the appropriate moment to generate more DMA requests. Because the device driver can execute at the same time that the DMA engine is transferring data, this decision can be made in parallel to data transfer operations. Hence, by the time that a particular application's data transfer requests have been satisfied, the system can ensure that the application be running on the CPU and able to generate more requests.

Figure 16:
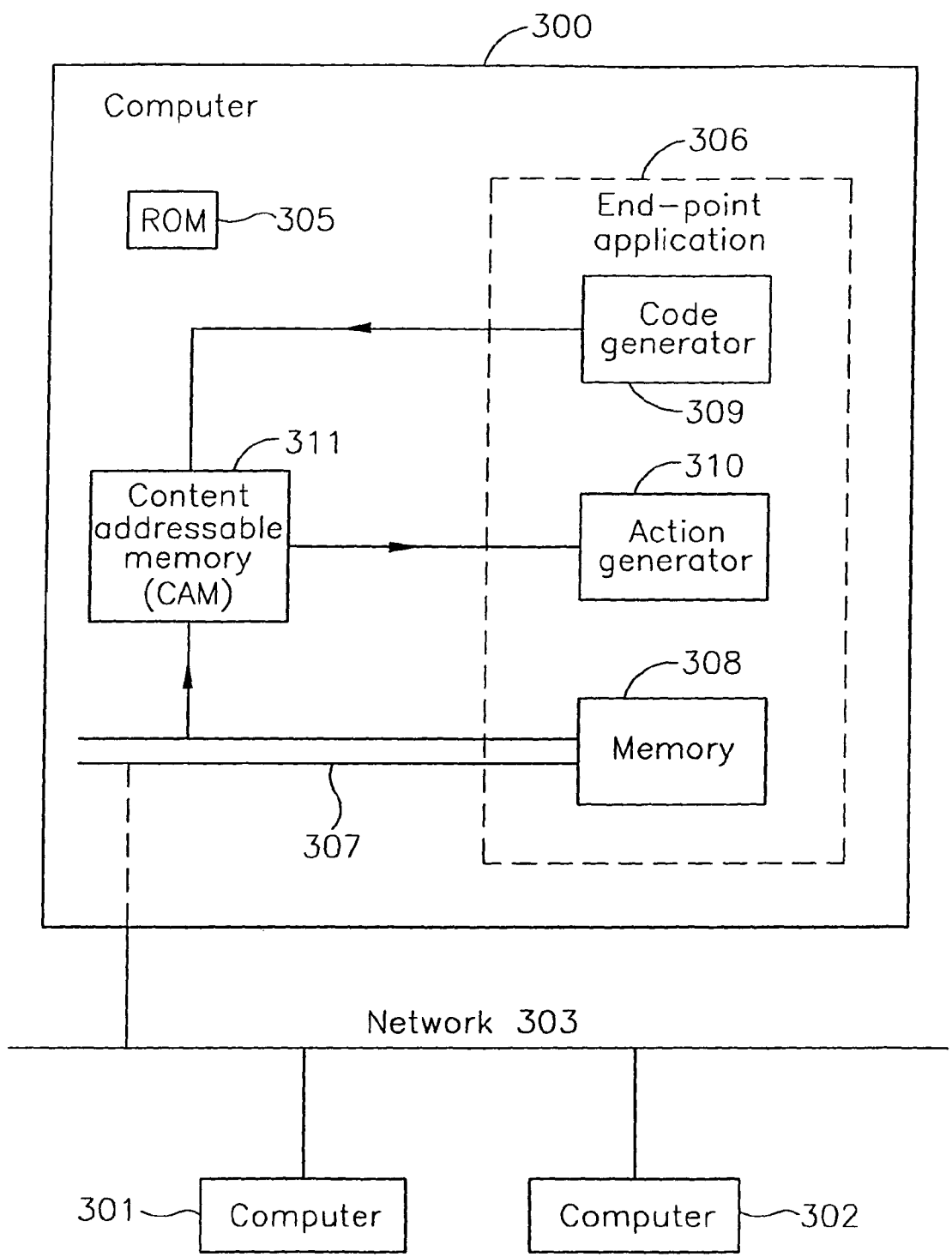
FIG. 16 shows an apparatus for synchronising an end-point application and constituting an embodiment of the invention.

FIG. 16 illustrates a generalised apparatus or arrangement for synchronising an end-point application using a tripwire. An end-point is a final destination for an information stream and is the point at which processing of the information takes place. Examples of end-points include a web, a file, a database server and hardware devices such as a disk or graphics controller. An end-point may be running an operating system and a number of data processing applications and these are referred to as end-point applications. Thus, examples of end-point applications include an operating system or a component thereof, a network protocol stack, and any application-level processing. Arrangements such as network switches and routers do not constitute end-points or end-point applications because their purpose is to ensure that the information is delivered elsewhere.

The arrangement comprises a computer 300 which is optionally connected to other computers 301 and 302 via a network 303. The computer 300 comprises a program memory (illustrated by way of example only as a read only memory (ROM) 305) which contains a program for controlling the computer to synchronise the end-point application in accordance with an address-based event in an information stream on an information pathway 307, such as a bus, within the computer. The information stream may be wholly within the computer, for example from another application performed by the computer 300, or may be from a remote source, such as from the network 303.

The bus 307 is connected to a memory 308 in the end-point application 306, which also comprises a code generator 309 and an action generator 310. The code generator 309 supplies codes to a comparator which is illustrated as a content addressable memory (CAM) 311. The CAM 311 has another input connected to the bus 307 and is arranged to perform a comparison between each entry in the CAM and the information stream on the bus 307. When a match is found, the CAM sends a signal to the action generator 310 which performs an action which is associated with an address-based event in the information stream.

In a typical example of use of the synchronising arrangement, the end-point application 306 sets a tripwire, for example to be triggered when data relating to an end-point address or range of end-point addresses in the memory 308 are present on the bus 307. The code generator 309 supplies a code which is written into the CAM 311 and which comprises the destination memory address of the data or possibly part of this address, such as the most significant bits when a range of addresses is to be monitored. It is also possible to enter a code which represents not only the address or range of addresses but also part or all of one or more items of data which are expected in the information stream. The CAM 311 compares the address of each data burst on the bus 307, and possibly also at least some of the data of each burst, with each code stored in the CAM 311 and supplies a signal to the action generator 310 when a match is found. The action generator 310 then causes the appropriate action to be taken within the end-point application 306. This may be a single action, several actions, or one or more specific actions which are determined not only by the triggering of the tripwire but also by the data within the information stream, for example arriving at the appropriate location or locations in the memory 308.

As mentioned hereinbefore, the information stream 307 may be wholly internal to the computer 300 and an example of this is an application-to-application stream of information where both applications are running, for example alternately, on the computer 300. However, the information stream may be partly or wholly from outside the computer 300, as illustrated by the broken line connection from the bus 307 to the network 303. Thus, the information stream may be from a switch fabric, a network, or a plurality of sources. A switch fabric is a device which has a plurality of inputs and outputs and which is capable of forwarding data from each input to the appropriate output according to routing information contained within the data. A switch fabric may alternatively be wholly contained within the computer. The information stream preferably has a data burst arrangement as described hereinafter and, in the case of a plurality of sources, the data bursts may arrive from any of the sources at any time, which amounts to multiplexing.

Figure 17:
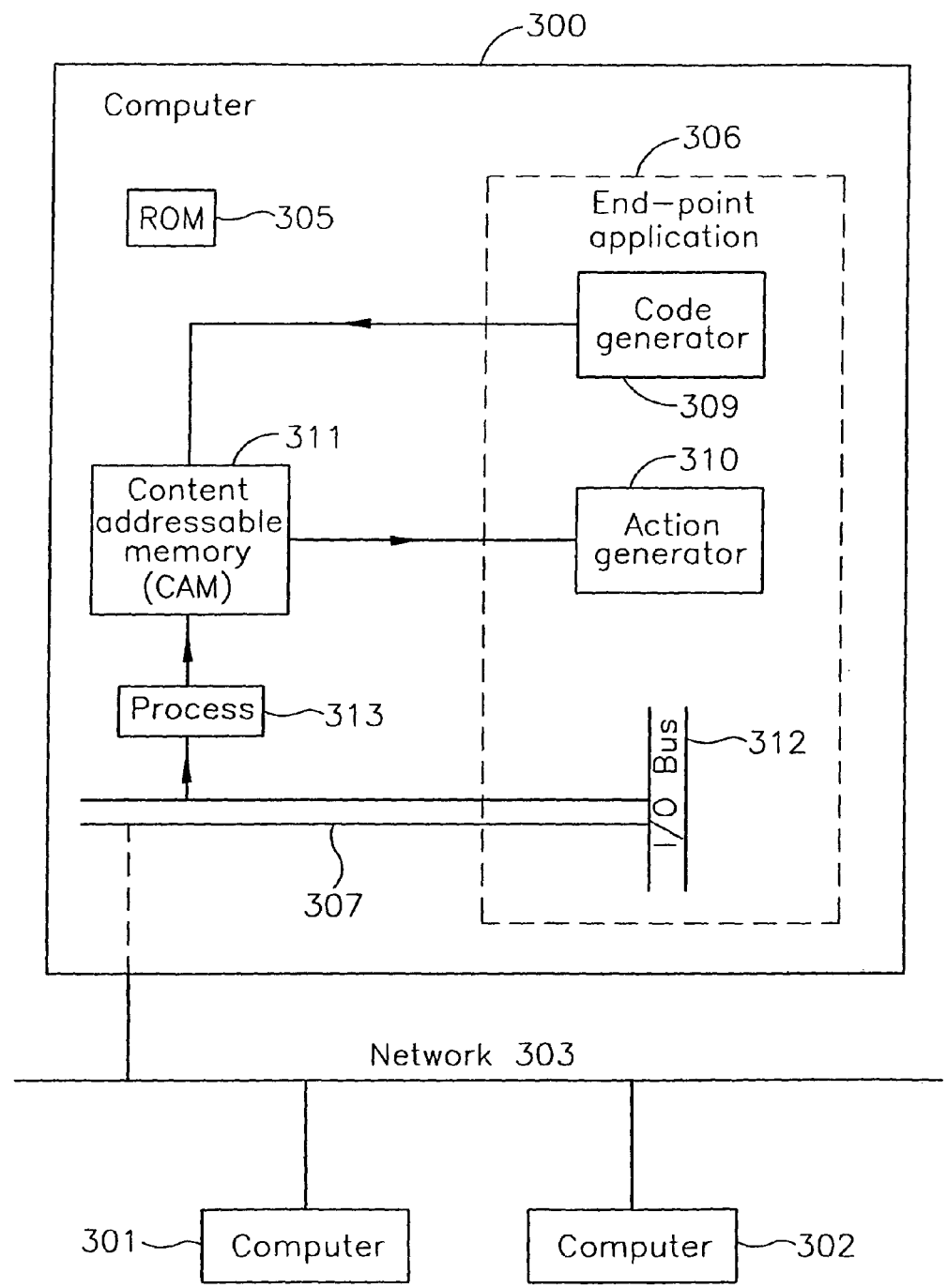
FIG. 17 shows another apparatus for synchronising an end-point application and constituting an embodiment of the invention.

FIG. 17 shows an arrangement which illustrates two possible modifications to the arrangement shown in FIG. 16. In this case, the bus 307 is connected to an input/output bus 312 of the end-point application 306 within the computer 300. This represents an example of a hardware end-point for the information stream but other types of hardware end-points are possible, such as active controllers, and may be located "outside" the application 306. An example of an active controller is a disk controller.

The arrangement shown in FIG. 17 also differs from that shown in FIG. 16 in that the tripwire may be triggered by an address-based event in the information stream on the bus 307 which does not exactly match any of the codes stored in the CAM 311. Instead, the information from the information stream on the bus 307 first passes through a process 313 before being supplied to the CAM for comparison with each of the stored codes.

One application of this is for the case where the information stream comprises packets or bursts of data starting with an address, for example corresponding to an address in the memory 308 to which the first item of data after the address in the packet or burst is allocated. Subsequent items of data are to be allocated to consecutive addresses, for example such that each item of data in the burst is to be allocated to the next highest address location after the preceding data item. Thus, the address at the start of each burst relates to the first data item and the following data item addresses can be inferred by incrementing the address upon the arrival of the second and each subsequent item of data.

The application 306 can cause the code generator 309 to store in the CAM 311 a code which corresponds to an implied address in the actual information stream appearing on the bus 307. The process 313 detects the address at the start of each data burst and supplies this to the CAM 311 with the arrival of the first data item. As each subsequent data item of the same burst arrives, the process 313 increments the address and supplies this to the CAM 311. This allows a tripwire to be triggered when, for example a data item having an implied address is present on the bus 307 because the CAM can match the corresponding stored code with the address supplied by the process 313.

As mentioned hereinbefore, the action generator 310 can cause any one or more of various different actions to be triggered by the tripwire. The resulting action may be determined by which tripwire has been triggered i.e. which code stored in the CAM 311 has been matched. It is also possible for the action to be at least partly determined by the data item which effectively triggered the tripwire. Any action may be targetted at the computer containing the tripwire or at a different computer. Various possible actions are described hereinafter as typical examples and may be performed singly or in any appropriate combination for the specific application and may be targetted at the computer containing the tripwire or at a different computer.

Figure 18:
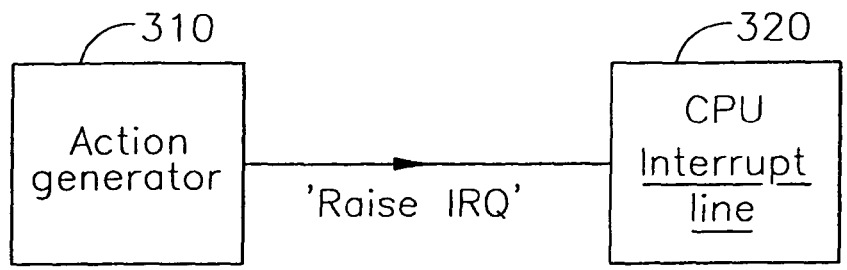
FIGS. 18 to 23 show examples of actions which may be performed by the apparatuses of FIGS. 16 and 17.
Figure 19:
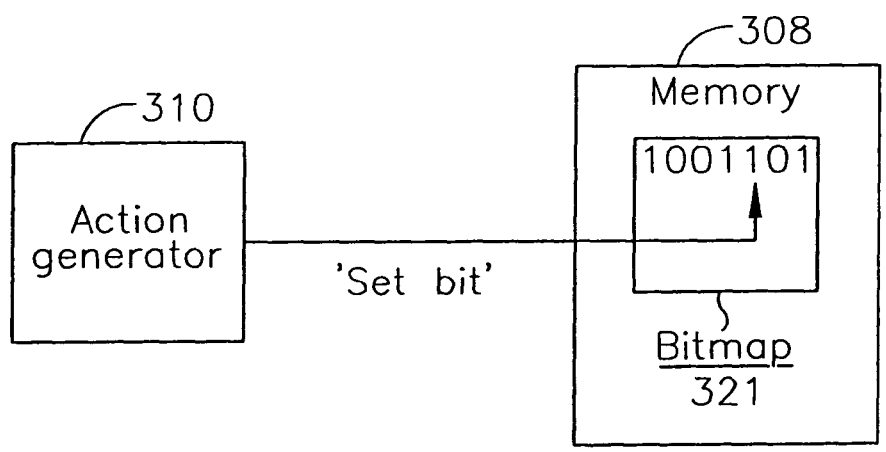

FIG. 18 illustrates the action generator 310 raising an interrupt request IRQ and supplying this to the interrupt line of a central processing unit (CPU) 320 of the computer 300. FIG. 19 illustrates the action generator 310 setting a bit in a bitmap 321, for example in the memory 308. These two actions may be used independently of each other or together. For example, the action generator may raise an interrupt request if an application which requires data corresponding to the tripwire is not currently running but is runnable; for example it has not exhausted its time-slice. Otherwise, for example if the application is awaiting rescheduling, the relevant bit in the bitmap 321 may be set. The operating system may periodically check the bitmap 321 for changes and, as a result of the arrival of the relevant data for an application which is presently not running, may decide to reschedule or wakeup the application.

Figure 20:
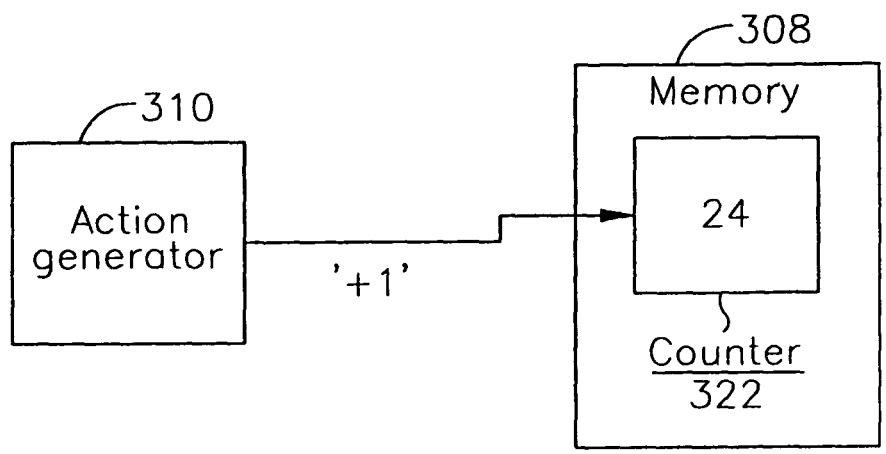

FIG. 20 illustrates another type of action which may be performed as a result of detection of the address-based event. In this example, a counter 322, for example whose count is stored within the memory 308, is incremented in response to triggering of the tripwire. Incrementing may take place as a result of any tripwire being triggered or only by one or more specific tripwires depending on the specific application.

Figure 21:
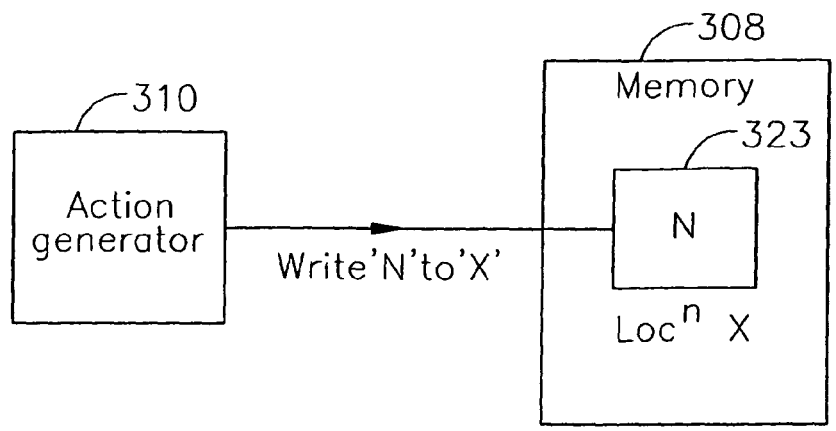

FIG. 21 illustrates another action which is such that, when the or the appropriate tripwire is triggered, a predetermined value "N" is written to a location "X" shown at 323 as being in the memory 308 (or being mapped thereto).

Figure 22:
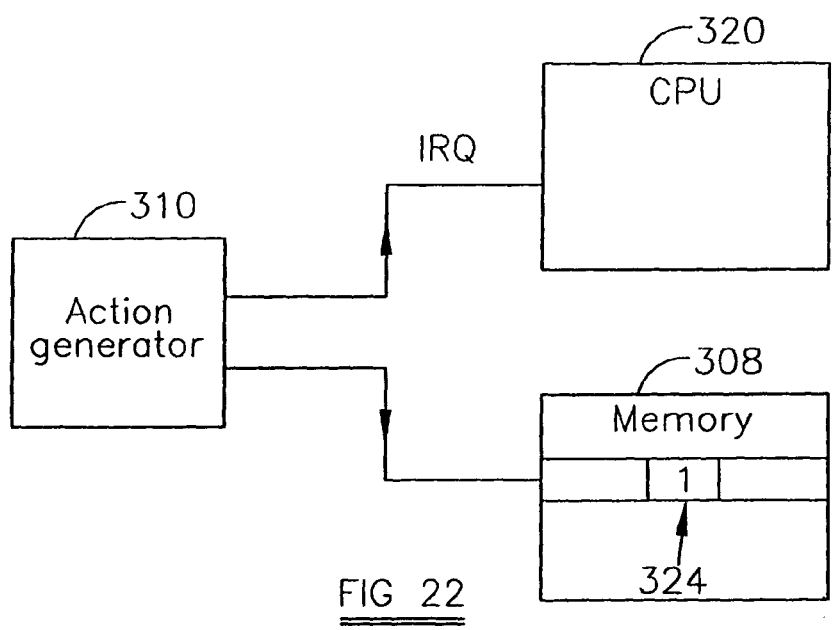

FIG. 22 illustrates another combination of actions which may be used to indicate that an application should be awakened or rescheduled. When a tripwire is triggered, an interrupt request is supplied to the CPU 320 and a "runnable bit" for a specific application is set at location 324 in the memory 308. The operating system of the computer 300 responds to the interrupt request by waking up or rescheduling the application whose runnable bit has been set.

Figure 23:
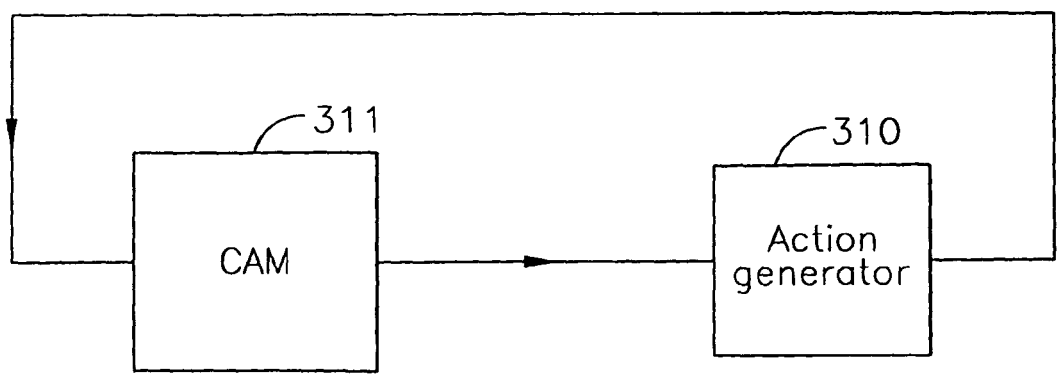

FIG. 23 illustrates an action which modifies entries in the CAM 311 in response to triggering of a tripwire. Any form of modification is possible. For example, the code which triggers the tripwire may be deleted if no further tripwires are required for the same address-based event. As an alternative, the code may be modified so as effectively to set a different but related tripwire. A further possibility is to generate a completely new code and supply this to the CAM 311 in order to set a new unrelated tripwire.

Figure 24:
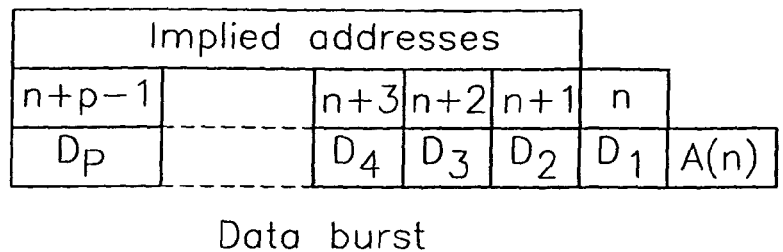
FIG. 24 illustrates the format of a data burst with implied addresses.

FIG. 24 illustrates the format of a data burst, a sequence of which forms the information stream on the bus 307. The data burst comprises a plurality of items which arrive one after the other in sequence on the bus. The first item is an address A(n) which is or corresponds to the end-point address, for example in the memory 308, for receiving the subsequent data items. This address is the actual address n of the first data item $D_1$ of the burst, which immediately follows the address A(n). The subsequent data items $D_2, D_3 \ldots, D_p$ arrive in sequence and their destination addresses are implied by their position within the burst relative to the first data item D1 and its address n. Thus, the second data item $D_2$ has an implied address n+1, the third data item $D_3$ has an implied address n+2 and so on. Each data item is written or supplied to the implied address as its destination address.

This data burst format may be used to fragment and coalesce bursts as the data stream passes through a forwarding unit 330, such as a network interface card or a switch, of an information pathway. For example, the forwarding unit can start to transmit a burst as soon as the first data item has arrived and does not have to wait until the whole data burst has arrived.

Figure 25:
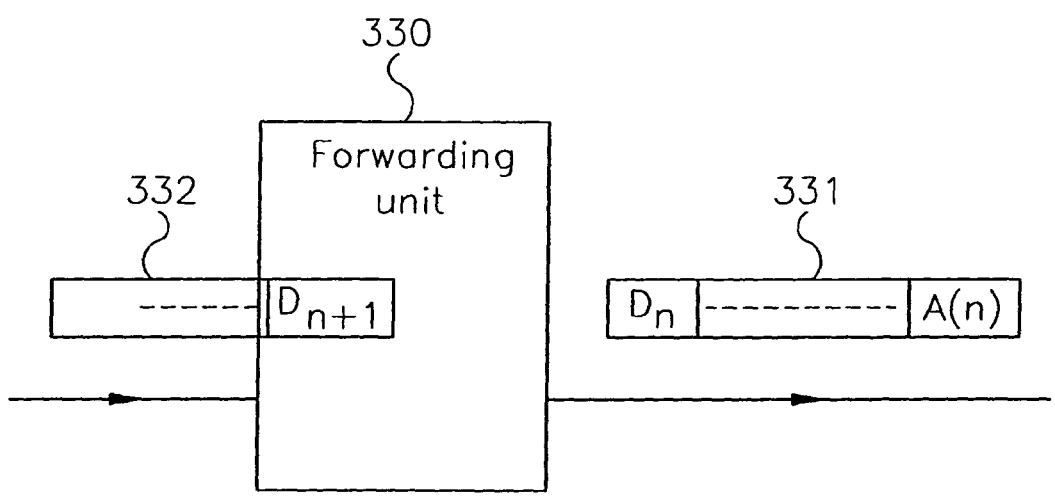
FIG. 25 illustrates an interruption in forwarding a burst of the type shown in FIG. 24.

FIG. 25 illustrates an example of this in which an interruption in the data burst occurs. The forwarding unit 330 has already started transmission of the burst and the first r data items 331 together with the burst address have already been forwarded. The remainder 332 of the burst has not yet arrived and the forwarding unit 330 terminates forwarding or transmission of that burst.

Figure 26:
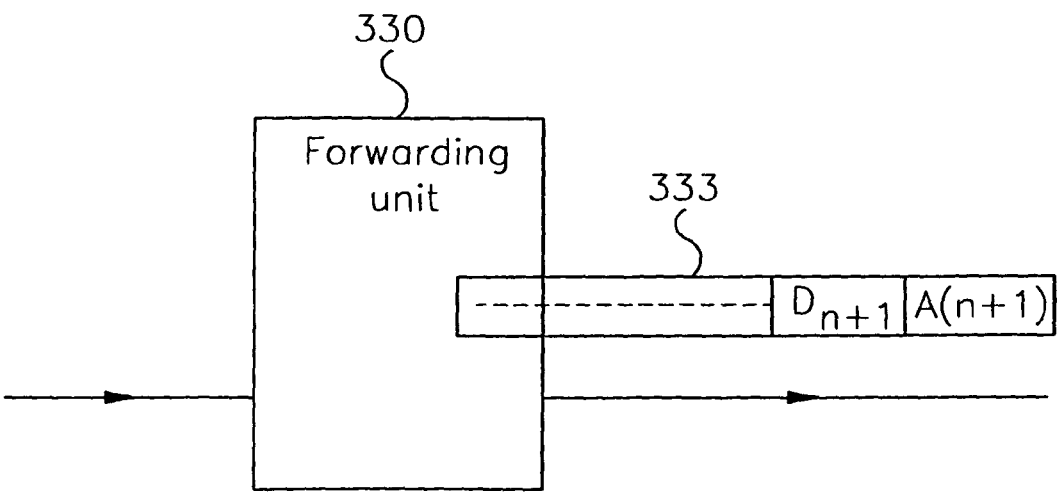
FIG. 26 illustrates forwarding of the rest of the burst.

When the remainder 332 of the burst starts to arrive, the forwarding unit 330 recalculates the destination address A(r+1) for the remainder of the burst and inserts this in front of the data item $D_{r+1}$. This is transmitted as a further burst 333 as illustrated in FIG. 26.

This technique may be used even when the whole burst is available for forwarding by the forwarding unit 330. For example, the forwarding unit 330 may terminate transmission of a particular burst before completion of transmission for reasons of arbitration between a number of competing bursts or for flow control reasons. Thus, individual data bursts can be forwarded in tact or can be sent in two or more fragments as necessary or convenient and all such bursts are treated as valid bursts by any subsequent forwarding units.

FIG. 27 illustrates an alternative situation in which the forwarding unit has an internal buffer 335 which contains first and second bursts 336 and 337. In this case, the implied address of the first data item $D_n+1$ of the second burst 337 immediately follows the implied address of the last data item $D_n$ of the first burst 336. The forwarding unit checks for such situations and, when they are found, coalesces the first and second bursts into a coalesced burst 338 as shown in the lower part of FIG. 27. The forwarding unit then transmits a single contiguous burst, which saves the overhead of the excess address information (which is deleted from the second burst). Any subsequent forwarding units then treat the coalesced burst 338 as a single burst. The format of the data burst allows such fragmentation or merging of bursts to take place. This in turn allows forwarding units to transmit data as soon as it arrives so as to reduce or minimise latency. Also, bursts of any length or number of data items can be handled which improves the flexibility of transmission of data.

Figure 28:
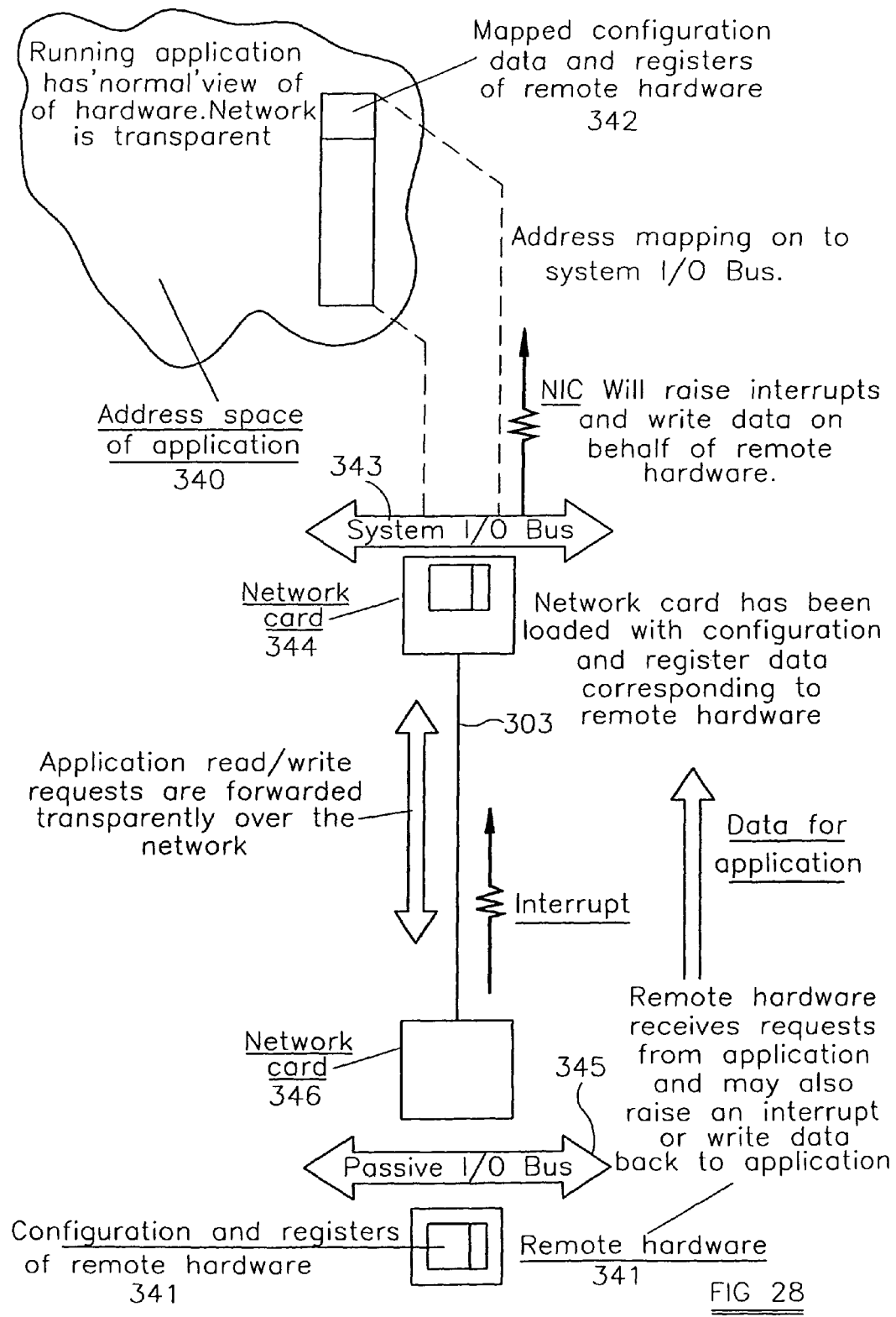
FIG. 28 illustrates "transparent" communication over a network between an application running on a computer and remote hardware.

FIG. 28 illustrates an example of communication between an application, whose address space is shown at 340, and remote hardware 341 via a network 303 such that the network 303 is "transparent" or "invisible" to each of the application and the remote hardware 341. The address space 340 contains mapped configuration data and registers of the remote hardware as indicated at 342. This is mapped onto the system input/output bus 343 to which a network interface card 344 is connected. The network interface card 344 is loaded with configuration and register data corresponding to the remote hardware 341. All application requests are forwarded over the network 303 transparently to the remote hardware 341 so that the remote hardware appears as though it is local to the application and the network 303 is invisible.

The remote hardware 341 is connected to a passive input/output bus 345 which is provided with a network interface card 346 for interfacing to the network 303. The configuration and registers of the remote hardware are illustrated at 347 and are mapped ultimately to the region 342 of the address space 340 of the application. Again, the network is invisible to the remote hardware 341 and the remote application appears to be local to it.

When the application sends a request to the remote hardware 341, for example requesting that the remote hardware supply data to be used in or processed by the application, this is written in the space 342 which is mapped to the system input/output bus 343. The network interface card 344 sends read/write requests over the network 303 to the card 346, which supplies these via the passive input/output bus 345 to the remote hardware 341. Viewed from the remote hardware 341, the bus 345 appears equivalent to the bus 343.

The remote hardware 341 may supply an interrupt and/or data for the application to the bus 345. Again, the network interface card 346 sends this via the network 303 to the card 344. The network interface card 344 supplies an interrupt request to the computer running the application and writes the data on behalf of the remote hardware to the space 342 in the address space 340 of the application. Thus, to the application, the remote hardware 341 appears to be connected directly to the bus 343.

Figure 29:
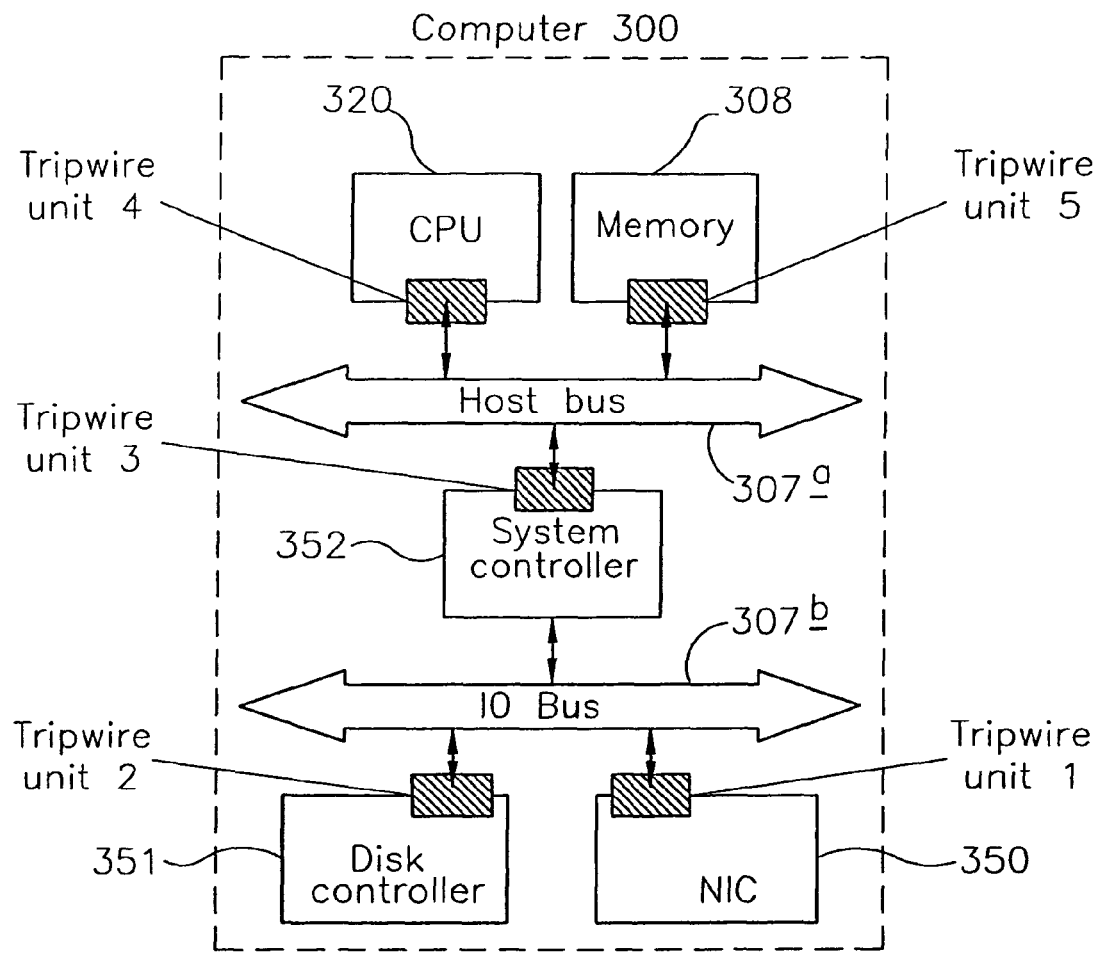
FIG. 29 illustrates applications of various tripwires at different locations in a computer.

Although implementations of tripwires have been described in detail hereinbefore with reference to the tripwire unit 1 shown in FIG. 29 associated with the network interface card 350, tripwires may be implemented at other points in a system as illustrated by tripwire units 2 to 5 in FIG. 29. The system comprises a disk controller 351 connected to an input/output bus 307b and the tripwire unit 2 is implemented as part of the disk controller 351. Such an arrangement allows tripwire operations to inform applications of any characteristic data transfer to or from the disk controller 351. Such an arrangement is particularly useful where the controller 351 is able to transfer data to and from a non-contiguous memory region corresponding to user-level buffers of an application. This allows data transfer and application level notification to be achieved without requiring hardware interrupts or kernel intervention.

The tripwire unit 3 is associated with a system controller 352 connected to a host bus 307a and the input/output bus 307b. Such an arrangement allows tripwire operations to inform applications of any characteristic data transfer to or from any device in the computer system. This includes hardware devices, such as the disk controller 351 and the network interface card 350, and, in the case of a system employing several CPUs, enables an application running on one of the CPUs to synchronise on a data transfer to or from an application running on another of the CPUs. Similarly, a tripwire may be used for synchronisation between applications running on the same CPU. This reduces the need for other mechanisms such as spin locks where both applications are required to operate in lock-step with the data transfer.

Tripwire units 4 and 5 are implemented in the CPU 320 or the memory 308. This is generally equivalent to the tripwire unit 3, where all data transfers in the system can be monitored. However, the tripwire unit 4 may monitor data written by an application to cache, which may not appear on the host bus 307a.

The invention claimed is:
1. A method of sending a request from a client application on a first computer to a server application on a second computer, the method comprising:
    producing, with first software stubs, a first marshalled stream of data representing the request;

conveying the first marshalled stream of data representing the request from the client application to the second computer;
receiving a first portion of a second marshalled stream of data at the first computer from the server application, the second marshalled stream of data representing a response from the server application;
unmarshalling the first portion of the second marshalled stream of data with second software stubs that convert the second marshalled stream of data into a representation of the response, the unmarshalling of the first portion occurring at the client application at the same time as receiving a second portion of the second marshalled stream of data from the server application;
comparing at least a portion of the response received from the server application with a triggering value corresponding to a property of an aspect of an expected response; and
when the triggering value matches the portion of the received response, generating an indication that the triggering value matches the portion of the received response.

2. The method according to claim 1, further comprising:
identifying a pointer memory location in a buffer of the second computer to store data being transferred, the pointer memory location including a write pointer to indicate a first buffer area available for a write operation and a read pointer to indicate a second buffer area available for a read operation;
writing to the buffer of the second computer based on at least one of the write pointer and the read pointer; and
updating a value of the write pointer after the write operation occurs to indicate a first updated area of the buffer of the second computer that is available for the read operation and a second updated area of the buffer of the second computer that is available for the write operation.

3. The method according to claim 1, further comprising sending the first and second marshalled streams of data over the network via memory mapped network interfaces.

4. The method according to claim 1, wherein the unmarshalling of the first portion of the second marshalled stream of data at the client application occurs at the same time as a third portion of the second marshalled stream of data is marshalled at the second computer.

5. The method according to claim 1, further comprising requesting an interrupt in response to the indication.

6. The method according to claim 1, further comprising changing a value of a counter in response to the indication.

7. The method according to claim 1, wherein the client application, while waiting for the response from the server application, blocks an event counter.

8. The method according to claim 1, wherein the client application, while waiting for the response from the server application, polls an event counter.

9. A method of sending a response from a server application implemented on a second computer to a client application implemented on a first computer, the method comprising:
receiving a first marshalled stream of data representing a request from the client application at the second computer;
unmarshalling the first marshalled stream of data at the server application with first software stubs which convert the first marshalled stream of data into a representation of the request;
processing the representation of the request and generating a response;
producing with second software stubs a second marshalled stream of data representing the response; and
sending, by the server application, a first portion of the second marshalled stream of data to the first computer at a same time when the client application is unmarshalling a second portion of the second marshalled stream of data sent from the server application, an indication that the response matches a triggering value to be generated when a comparison of the response to the triggering value indicates that the response matches a property of an aspect of an expected response represented by the triggering value.

10. The method according to claim 9, wherein the second software stubs and a hardware device generate the response.

11. The method according to claim 10, wherein first and second parts of the response are sent to a segment of a buffer of the first computer such that the first and second parts of the response together comprise the second marshalled data stream representing the response from the server application.

12. The method according to claim 9, wherein the unmarshalling of the first portion of the first marshalled stream of data at the server application occurs at the same time as a third portion of the first marshalled stream of data is marshalled at the first computer.

13. The method according to claim 9, further comprising:
storing data identifying a pointer memory location in a buffer of the second computer;
storing at the pointer memory location a write pointer and a read pointer, the write pointer to indicate a first buffer area available for a write operation and the read pointer to indicate a second buffer area available for a read operation;
reading from the buffer of the second computer based on at least one of the write pointer and the read pointer; and
updating a value of the read pointer after a read occurs.

14. The method according to claim 9, further comprising sending the first and second marshalled streams of data over the network using memory mapped network interfaces.

15. A tangible machine readable memory device or disk comprising instructions which, when executed, cause a machine to perform a method comprising:
producing a first marshalled stream of data representing a request to be conveyed from a first computer implementing a client application to a second computer implementing a server application;
conveying the marshalled stream of data representing the request from the client application to the second computer;
unmarshalling a first portion of a second marshalled stream of data at the client application at the same time as receiving a second portion of the second marshalled stream of data from the second computer, the second marshaled stream of data representing a response from the server application, the unmarshalling of the first portion of the second marshalled stream of data to convert the second marshalled stream of data into a representation of the response;
comparing at least a portion of the response received from the server application with a triggering value corresponding to a property of an aspect of an expected response: and
when the triggering value matches the portion of the received response, generating an indication that the triggering value matches the portion of the received response.

16. A tangible machine readable memory device or disk according to claim 15, wherein the unmarshalling of the first portion of the second marshalled stream of data at the client application occurs at the same time as a third portion of the second marshalled stream of data is marshalled at the second computer.

* * * * *